United States Patent
Tan

(10) Patent No.: US 9,772,797 B2
(45) Date of Patent: Sep. 26, 2017

(54) BUFFER MEMORY MANAGEMENT METHOD, MEMORY CONTROL CIRCUIT UNIT AND MEMORY STORAGE DEVICE

(71) Applicant: PHISON ELECTRONICS CORP., Miaoli (TW)

(72) Inventor: Kok-Yong Tan, Miaoli County (TW)

(73) Assignee: PHISON ELECTRONICS CORP., Miaoli (TW)

( * ) Notice: Subject to any disclaimer, the term of this patent is extended or adjusted under 35 U.S.C. 154(b) by 25 days.

(21) Appl. No.: 15/007,222

(22) Filed: Jan. 27, 2016

(65) Prior Publication Data

US 2017/0139642 A1    May 18, 2017

(30) Foreign Application Priority Data

Nov. 17, 2015  (TW) .............................. 104137866 A

(51) Int. Cl.
| | | |
|---|---|---|
| *G06F 12/08* | (2016.01) | |
| *G06F 3/06* | (2006.01) | |
| *G06F 12/0804* | (2016.01) | |

(52) U.S. Cl.
CPC .......... *G06F 3/0656* (2013.01); *G06F 3/0617* (2013.01); *G06F 3/0631* (2013.01); *G06F 3/0679* (2013.01); *G06F 12/0804* (2013.01); *G06F 2212/222* (2013.01); *G06F 2212/281* (2013.01); *G06F 2212/313* (2013.01); *G06F 2212/7201* (2013.01); *G06F 2212/7203* (2013.01)

(58) Field of Classification Search
CPC .... G06F 3/0656; G06F 3/0617; G06F 3/0631; G06F 3/0679; G06F 12/10–12/109; G06F 2212/7201; G06F 2212/7203; G06F 2212/222; G06F 2212/281; G06F 2212/313
See application file for complete search history.

(56) References Cited

U.S. PATENT DOCUMENTS

| | | | | |
|---|---|---|---|---|
| 2008/0250188 A1* | 10/2008 | Nakanishi | ........... | G06F 11/1441 711/1 |
| 2012/0215965 A1* | 8/2012 | Inada | ................. | G06F 12/0246 711/103 |

* cited by examiner

*Primary Examiner* — Aracelis Ruiz
(74) *Attorney, Agent, or Firm* — Jianq Chyun IP Office

(57) ABSTRACT

A buffer memory management method, a memory control circuit unit and a memory storage device are provided. The method includes allocating a first zone and a second zone in the buffer memory for temporarily storing a plurality of logical address-physical address mapping tables and performing a restore operation on the first zone. The method also includes receiving a write command, wherein a logical address-physical address table to which a logical address indicated by the write command belongs has been temporarily stored in the first zone. The method further includes copying the logical address-physical address table into the second zone, and updating the logical address-physical address table in the second zone.

18 Claims, 17 Drawing Sheets

BUFFER MEMORY MANAGEMENT METHOD, MEMORY CONTROL CIRCUIT UNIT AND MEMORY STORAGE DEVICE

CROSS-REFERENCE TO RELATED APPLICATION

This application claims the priority benefit of Taiwan application serial no. 104137866, filed on Nov. 17, 2015. The entirety of the above-mentioned patent application is hereby incorporated by reference herein and made a part of this specification.

BACKGROUND

Technical Field

The present invention relates to a buffer memory management method, and more particularly, to a buffer memory management method, a memory control circuit unit and a memory storage device.

Description of Related Art

The markets of digital cameras, cellular phones, and MP3 players have expanded rapidly in recent years, resulting in escalated demand for storage media by consumers. The characteristics of data non-volatility, low power consumption, and compact size make a rewritable non-volatile memory module (e.g., a flash memory) ideal to be built in the portable multi-media devices as cited above.

In general, a memory storage device using the rewritable non-volatile memory module as a storage medium is usually disposed with a buffer memory, which is configured to temporarily store program codes and data, or serve as a temporarily zone for data used when background tasks are performed by the memory storage device. For example, a controller of the memory storage device can load logical address-physical address mapping tables into the buffer memory in order to access data. When a write command for performing a write operation is received, the controller of the memory storage device updates the logical address-physical address mapping tables temporarily stored in the buffer memory. Also, when the buffer memory is temporarily stored with a large amount of the updated logical address-physical address mapping tables, the controller of the memory storage device restores the updated logical address-physical address mapping table in the buffer memory back to the rewritable non-volatile memory module. As it is possible that the updated logical address-physical address mapping tables are not temporarily stored in continuous buffer units of the buffer memory and the rewritable non-volatile memory module utilizes a physical programming unit as a minimum unit for writing; therefore, the updated logical address-physical address mapping tables must be copied to the temporary zone in the buffer memory, and then restored back to the rewritable non-volatile memory module only until the updated logical address-physical address mapping tables are collected into an equivalent size of one physical programming unit. However, this great amount of copying operations will leads to system overload and excessive restoring time, resulting in degradation for overall performance.

Moreover, while restoring the updated logical address-physical address mapping tables in the buffer memory to the rewritable non-volatile memory module, if a write command is received such that the restored logical address-physical address mapping table being restored needs to be updated again, the controller of the memory storage device temporarily suspends receiving data of the write command and execution of the write command. As a result, the prolonged wait time may cause failure to write. Accordingly, how to improve efficiency of restoring the logical address-physical address mapping tables from the buffer memory back to the rewritable non-volatile memory module and system stability are major subjects for person skilled in the art.

Nothing herein should be construed as an admission of knowledge in the prior art of any portion of the present invention. Furthermore, citation or identification of any document in this application is not an admission that such document is available as prior art to the present invention, or that any reference forms a part of the common general knowledge in the art.

SUMMARY

The present invention is directed to a buffer memory management method, a memory control circuit unit and a memory storage device, which are capable of improving system stability and efficiency of restoring the logical address-physical address mapping table from the buffering memory back to the rewritable non-volatile memory module.

An exemplary embodiment of the present invention provides a buffer memory management method, which is adapted to a buffer memory of a memory storage device. The memory storage device has a rewritable non-volatile memory module. The buffer memory management method includes allocating a first zone and a second zone in the buffer memory, wherein each of the first zone and the second zone has a plurality of continuous buffer units, and at least a portion of the buffer units in the first zone and the second zone are stored with logical address-physical address tables. The memory management method also includes performing a restore operation on the buffer units in the first zone to restore the logical address-physical address mapping tables stored in the first zone to the rewritable non-volatile memory module. The buffer memory management method also includes receiving a first write command from the host system, the first write command instructs writing first data into a first logical address, and a first logical address-physical address mapping table to which the first logical address belongs is temporarily stored in a first buffer unit among the buffer units in the first zone. The memory management method further includes writing the first data into the rewritable non-volatile memory module, and copying the first logical address-physical address mapping table of the first zone to a second buffer unit among the buffer units in the second zone. The memory management circuit further includes updating the first logical address-physical address mapping table temporarily stored in the second buffer unit in the second zone.

In an exemplary embodiment of the present invention, a memory control circuit unit is configured to control the rewritable non-volatile memory module. The memory control circuit unit includes a host interface, a memory interface, a buffer memory and a memory management circuit. The host interface is coupled to the host system. The memory interface is coupled to the rewritable nonvolatile memory module. The buffer memory is coupled to the host interface and the memory interface. The memory management circuit is coupled to the host interface, the memory interface and the buffer memory. The buffer memory management method allocates a first zone and a second zone in the buffer memory, wherein each of the first zone and the second zone has a plurality of continuous buffer units, and at least a portion of the buffer units in the first zone and the second zone are stored with logical address-physical address tables. Furthermore, the memory management circuit also performs a restore operation on the buffer units in the first zone to restore the logical address-physical address mapping tables stored in the first zone to the rewritable non-volatile memory module. In addition, the memory management circuit further receives a first write command from the host system. The first write command instructs writing first data into a first logical address, and a first logical address-physical address mapping table to which the first logical address belongs is temporarily stored in a first buffer unit among the buffer units in the first zone. Additionally, the memory management circuit further writes the first data into the rewritable non-volatile memory module, and copies the first logical address-physical address mapping table of the first zone to a second buffer unit among the buffer units in the second zone. Additionally, the memory management circuit updates the first logical address-physical address mapping table temporarily stored in the second buffer unit in the second zone.

An exemplary embodiment of the present invention provides a memory storage device which includes a connection interface unit, a rewritable non-volatile memory module and the aforesaid memory control circuit unit. The connection interface unit is coupled to the host system. The memory control circuit unit is coupled to the connection interface unit and the rewritable non-volatile memory module, and includes a buffer storage unit.

Based on the above, the memory control circuit unit, the memory storage device and the buffer memory management method thereof proposed according to the exemplary embodiments of the invention are capable of effectively saving the time spent for restoring the logical address-physical address mapping tables back to the rewritable non-volatile memory module, and continue receiving write data from the host system during restore period, improving the overall operational efficiency and stability of the system.

The following embodiments and figures illustrate the above-described features.

It should be understood, however, that this Summary may not contain all of the aspects and embodiments of the present invention, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
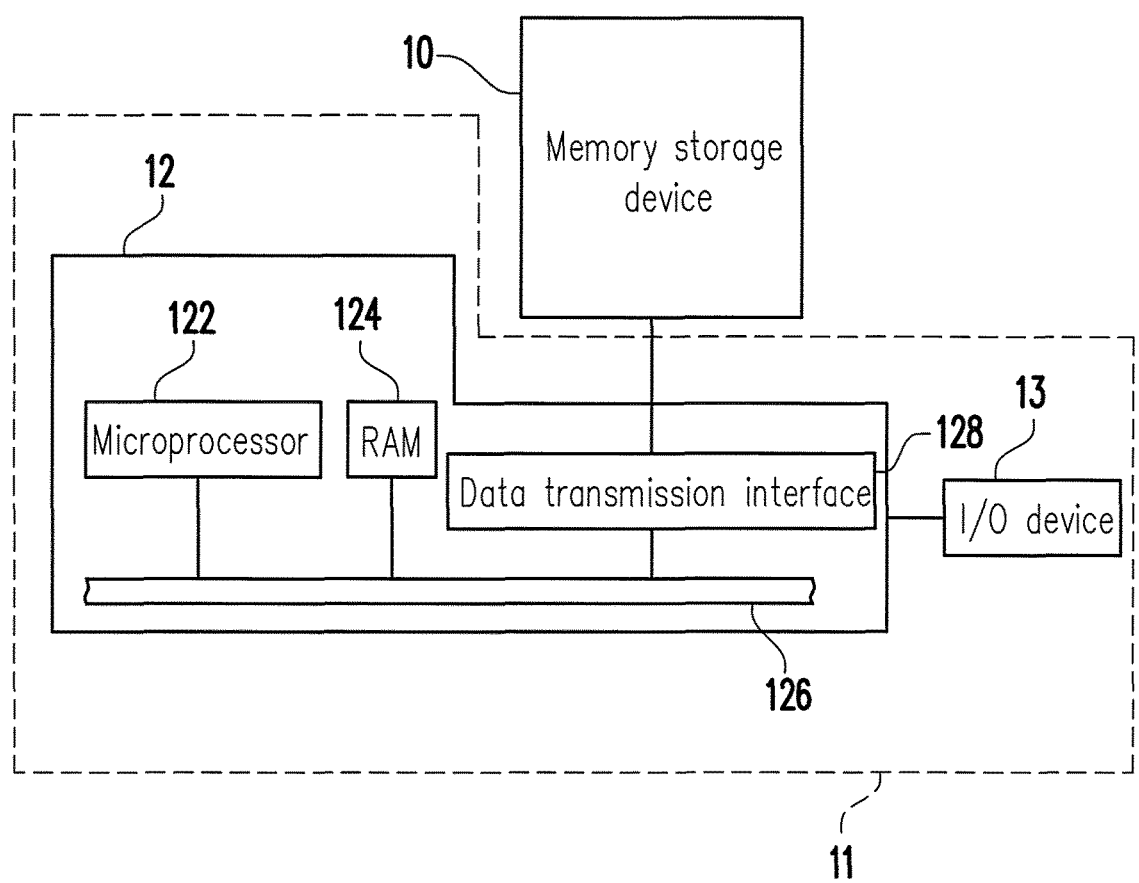
FIG. 1 is a schematic diagram illustrating a host system and a memory storage device according to an exemplary embodiment.

Reference will now be made in detail to present the preferred embodiments of the invention, examples of which are illustrated in the accompanying drawings. Wherever possible, the same reference numbers are used in the drawings and the description to refer to the same or like parts.

Embodiments of the present invention may comprise any one or more of the novel features described herein, including in the Detailed Description, and/or shown in the drawings. As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein.

Generally, a memory storage device (also known as a memory storage system) includes a rewritable non-volatile memory module and a controller (also known as a control circuit unit). The memory storage device is usually configured together with a host system so that the host system may write data into the memory storage device or read data from the memory storage device.

Figure 2:
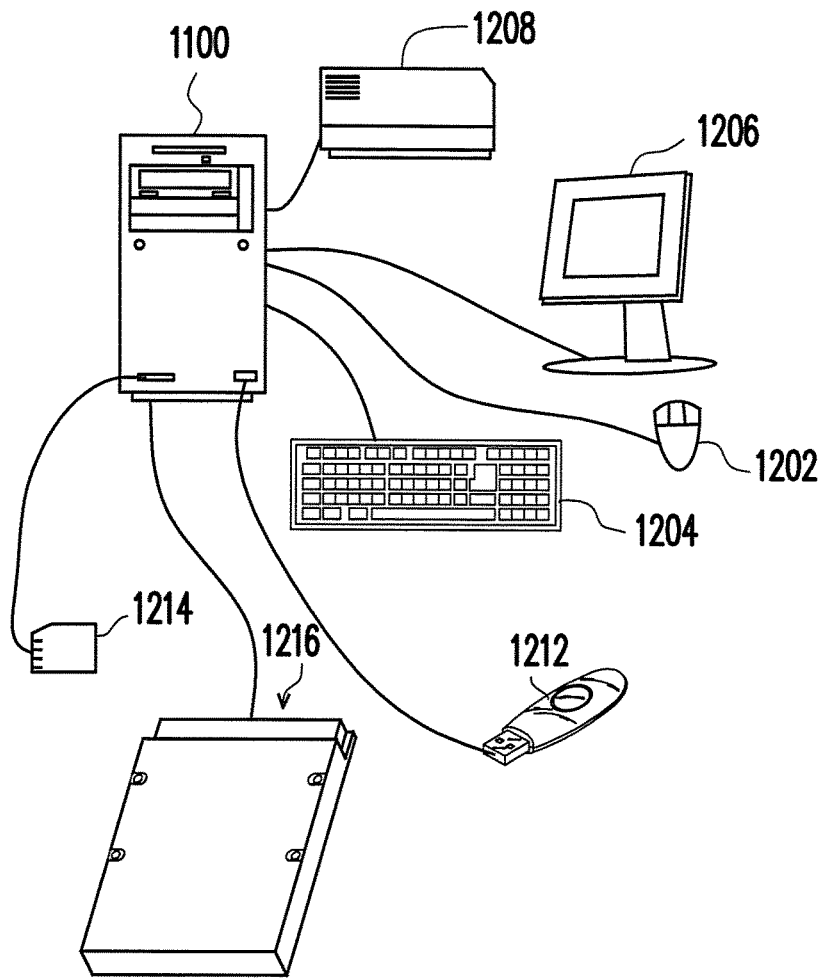
FIG. 2 is a schematic diagram illustrating a computer, an input/output device and a memory storage device according to an exemplary embodiment.

FIG. 1 is a schematic diagram illustrating a host system and a memory storage device according to an exemplary embodiment, and FIG. 2 is a schematic diagram of a computer, an input/output device, and a memory storage device according to an exemplary embodiment.

Referring to FIG. 1, a host system 11 includes a computer 12 and an input/output (I/O) device 13. The computer 12 includes a microprocessor 122, a random access memory (RAM) 124, a system bus 126, and a data transmission interface 128. For example, the I/O device 13 includes a mouse 21, a keyboard 22, a display 23 and a printer 24 as shown in FIG. 2. It should be understood that the devices illustrated in FIG. 2 are not intended to limit the I/O device 13, and the I/O device 13 may further include other devices.

In the present exemplary embodiment, a memory storage device 10 is electrically connected to other devices of the host system 11 through the data transmission interface 128. By using the microprocessor 122, the random access memory 124 and the Input/Output (I/O) device 13, data may be written into the memory storage device 10 or may be read from the memory storage device 10. For example, the memory storage device 10 may be a rewritable non-volatile memory storage device such as a flash drive 25, a memory card 26, or a solid state drive (SSD) 27 as shown in FIG. 2.

Figure 3:
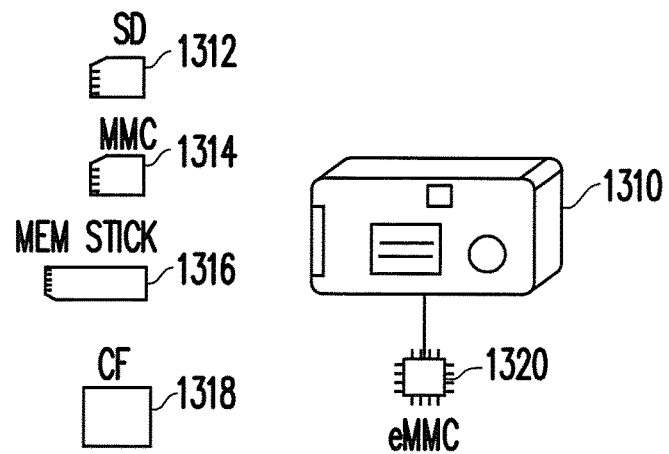
FIG. 3 is a schematic diagram illustrating a host system and a memory storage device according to an exemplary embodiment of the invention.

FIG. 3 is a schematic diagram illustrating a host system and a memory storage device according to an exemplary embodiment.

Generally, the host system 11 may substantially be any system capable of storing data with the memory storage device 10. Even though the host system 11 is illustrated as a computer system in the present exemplary embodiment, however, in another exemplary embodiment of the present invention, the host system 11 may be a digital camera, a video camera, a telecommunication device, an audio player, or a video player. For example, when the host system is a digital camera (video camera) 31 in FIG. 3, the rewritable non-volatile memory storage device may be a SD card 32, a MMC card 33, a memory stick 34, a CF card 35 or an embedded storage device 36 (as shown in FIG. 3). The embedded storage device 36 includes an embedded MMC (eMMC), or a universal flash storage, (UFS). It should be mentioned that, the eMMC (or the UFS) is electrically connected to a substrate of the host system, directly.

Figure 4:
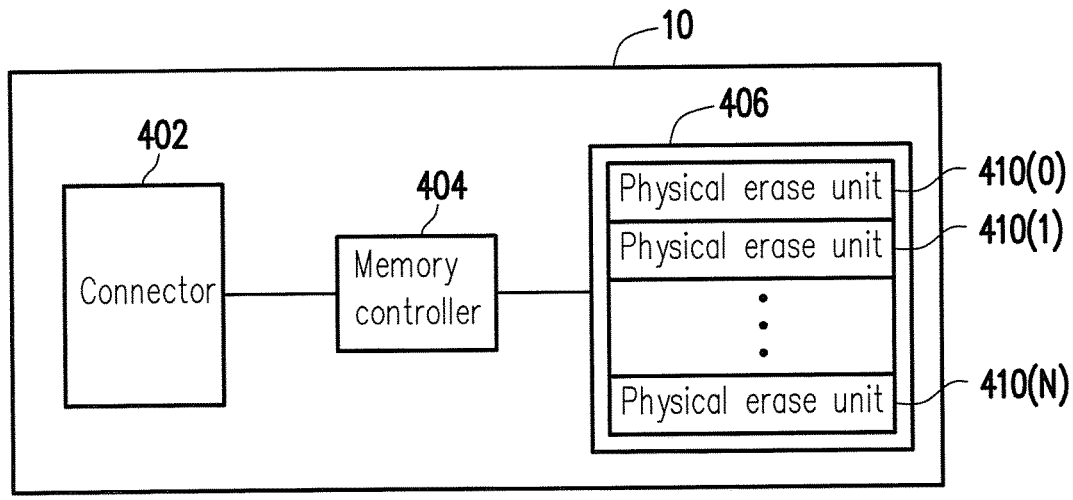
FIG. 4 is a schematic block diagram illustrating a memory storage device according to an exemplary embodiment.

FIG. 4 is a schematic block diagram illustrating a memory storage device according to an exemplary embodiment.

Referring to FIG. 4, the memory storage device 10 includes a connection interface unit 402, a memory control circuit unit 404 and a rewritable non-volatile memory module 406.

In the present exemplary embodiment, the connection interface unit 402 is compatible with a serial advanced technology attachment (SATA) standard. However, the invention is not limited thereto, and the connection interface unit 402 may also be compatible with Parallel Advanced Technology Attachment (PATA) standard, Institute of Electrical and Electronic Engineers (IEEE) 1394 standard, Peripheral Component Interconnect (PCI) Express interface standard, Universal Serial Bus (USB) standard, Ultra High Speed-I (UHS-I) interface standard, Ultra High Speed-II (UHS-II) interface standard, Secure Digital (SD) interface standard, Memory Stick (MS) interface standard, Multi Media Card (MMC) interface standard, Compact Flash (CF) interface standard, Integrated Device Electronics (IDE) interface standard or other suitable standards. In the present exemplary embodiment, the connection interface unit and the memory control circuit unit may be packaged into one chip, or emplaced outside of a chip containing the memory control circuit unit.

The memory control circuit unit 404 is configured to perform logic gates or control instructions which are implemented in form of hardware or firmware, so as to perform operations of writing, reading and erasing data in the rewritable non-volatile memory storage module 406 according to commands from the host system 11.

The rewritable non-volatile memory module 406 is coupled to the memory control circuit unit 404 and configured to store data written from the host system 11. The rewritable non-volatile memory storage module 406 has multiple physical erasing units 410(0) to 410(N). For example, the physical erasing units 410(0) to 410(N) may belong to the same memory die or belong to different memory dies. Each physical erasing unit has multiple physical programming units, and the physical programming units of the same physical erasing unit may be written separately and erased simultaneously. Nevertheless, it should be understood that the invention is not limited thereto. Each physical erasing unit is composed by 64 physical programming units, 256 physical programming units or any amount of the physical programming units.

More specifically, the physical erasing unit is the minimum unit for erasing. Namely, each physical erasing unit contains the least number of memory cells to be erased together. The physical programming unit is the minimum unit for programming. That is, the programming unit is the minimum unit for writing data. Each physical programming unit usually includes a data bit area and a redundancy bit area. The data bit area having multiple physical access addresses is used to store user data, and the redundant bit area is used to store system data (e.g., control information and error checking and correcting code). In the present exemplary embodiment, each data bit area of the physical programming unit contains 8 physical access addresses, and the size of each physical access address is 512 byte. However, in other exemplary embodiments, the data bit area may also include more or less physical access addresses, and the size and the number of the physical access addresses are not limited in the invention. For example, in an exemplary embodiment, the physical erasing unit is a physical block, and the physical programming unit is a physical page or a physical sector, but the invention is not limited thereto.

In the present exemplary embodiment, the rewritable non-volatile memory module 406 is a Multi Level Cell (MLC) NAND flash memory module (i.e., a flash memory module capable of storing two data bits in one memory cell). However, the invention is not limited thereto. The rewritable non-volatile memory module 406 may also be a Single Level Cell (SLC) NAND flash memory module, (i.e., a flash memory module capable of storing one data bit in one memory cell), a Trinary Level Cell (TLC) NAND flash memory module (i.e., a flash memory module capable of storing three data bits in one memory cell), other flash memory modules or any memory module having the same features.

Figure 5:
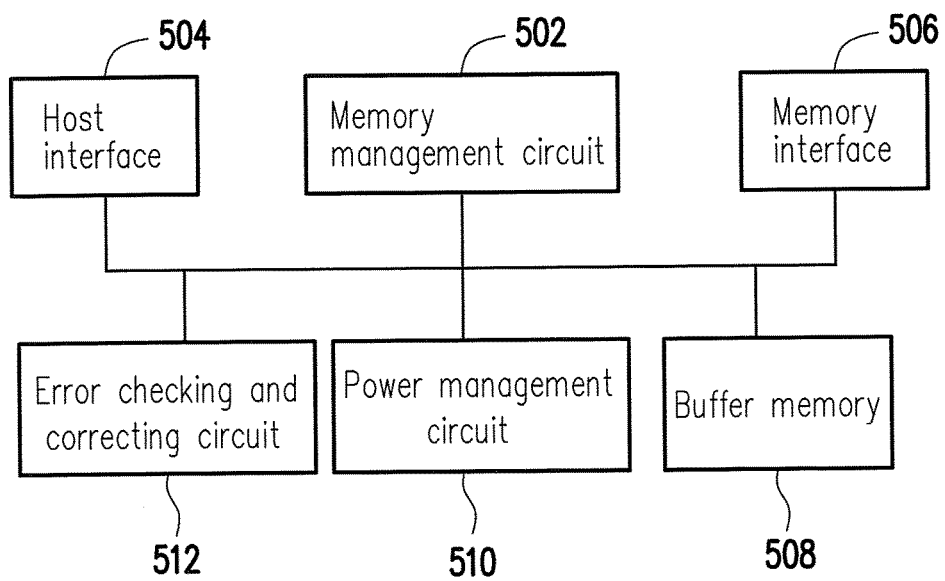
FIG. 5 is a schematic block diagram illustrating a memory control circuit unit according to an exemplary embodiment.

FIG. 5 is a schematic block diagram illustrating a memory control circuit unit according to an exemplary embodiment.

Referring to FIG. 5, the memory control circuit unit 404 includes a memory management circuit 502, a host interface 504, a memory interface 506, a buffer memory 508, a power management circuit 510, and an error checking and correcting (ECC) circuit 512.

The memory management circuit 502 is configured to control overall operations of the memory control circuit unit 404. Specifically, the memory management circuit 502 has control instructions. During operations of the memory storage device 10, the control instructions are performed to carry out various operations such as writing, reading and erasing data.

In the present exemplary embodiment, the control instructions of the memory management circuit 502 are implemented in form of firmware. For instance, the memory management circuit 502 has a microprocessor unit (not shown) and a read-only memory (not shown), and the control instructions are burnt into the read-only memory. When the memory storage device 10 operates, the control instructions are performed by the microprocessor to write, read or erase data.

Figure 6:
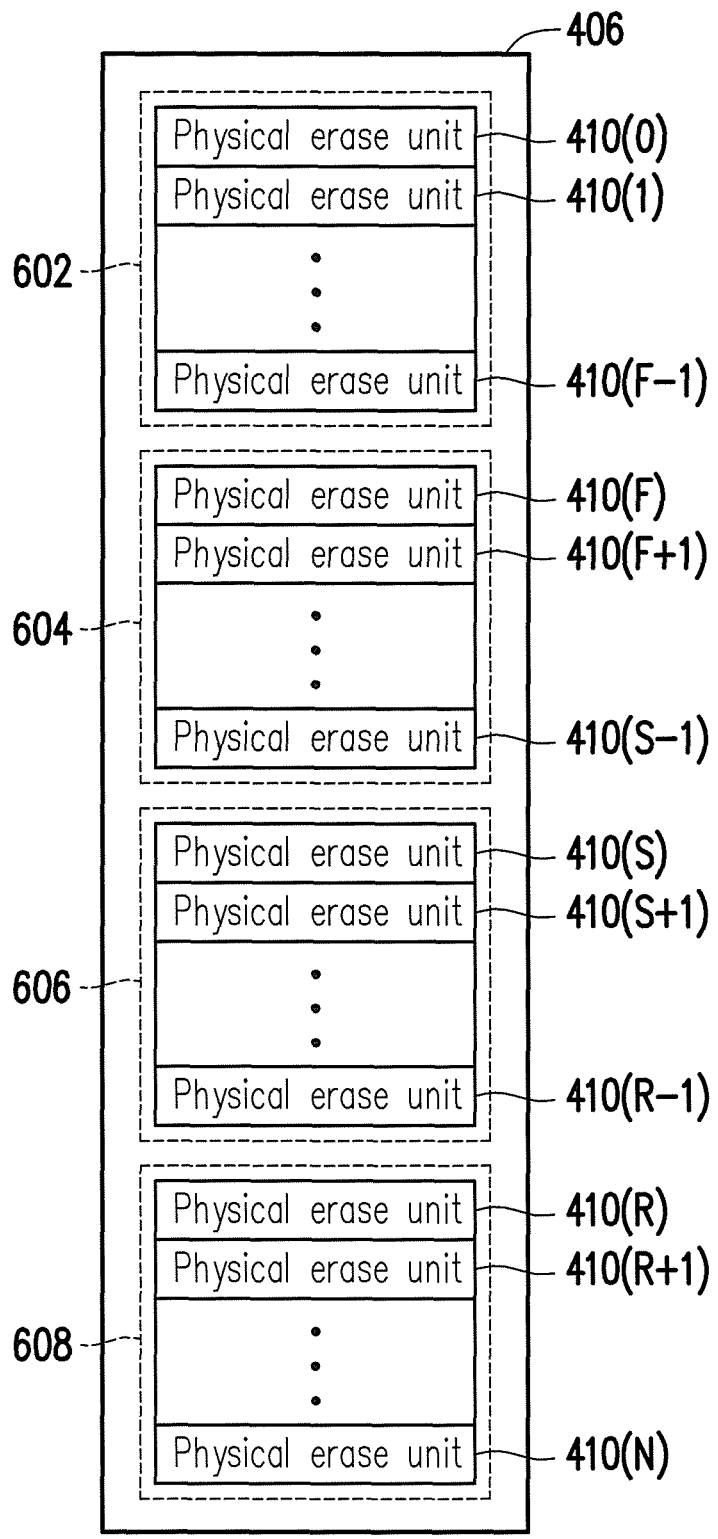
FIG. 6 and FIG. 7 are schematic diagrams illustrating a management of the physical erasing units according to an exemplary embodiment.
Figure 7:
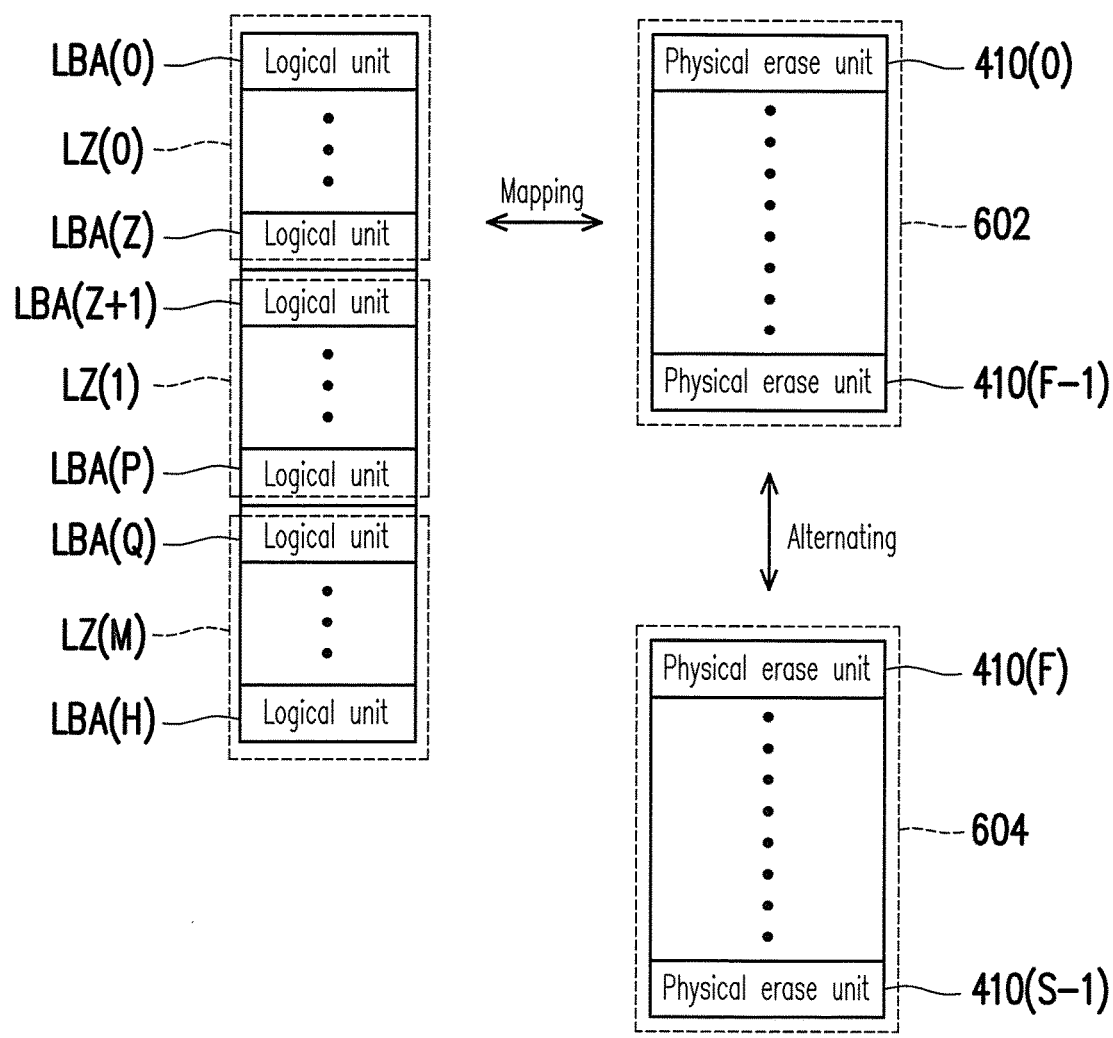

FIG. 6 and FIG. 7 are schematic diagrams illustrating a management of the physical erasing units according to an exemplary embodiment.

It should be understood that terms, such as "get", "group", "divide", "associate" and so forth, are logical concepts which describe operations of the physical erasing units of the rewritable non-volatile memory module 106. That is, the physical erasing units of the rewritable non-volatile memory module are logically operated, but actual positions of the physical erasing units of the rewritable non-volatile memory module are not changed.

Referring to FIG. 6, the memory control circuit unit 404 (or the memory management circuit 502) may logically group the physical erasing units 410(0) to 410(N) into a data area 602, a spare area 604, a system area 606 and a replacement area 608.

The physical erasing units logically belonging to the data area 602 and the spare area 604 are configured to store data from the host system 11. More specifically, the physical erasing units of the data area 602 are regarded as the physical erasing units stored with the data, whereas the physical erasing units of the spare area 604 are configured to replace the physical erasing units of the data area 602. In other words, when the write command and the data to be written are received from the host system 11, the memory management unit 502 selects the physical erasing units from the spare area 604, and writes the data into the selected physical erasing units in order to replace the physical erasing units in the data area 602.

The physical erasing units logically belonging to the system area 606 are configured to record system data. For instance, the system data includes information related to manufacturer and model of the rewritable non-volatile memory module, the number of physical erasing units in the rewritable non-volatile memory module, the number of the physical programming units in each physical erasing unit, and so forth.

The physical erasing units logically belonging to the replacement area 608 are used in a bad physical erasing unit replacement procedure for replacing damaged physical erasing units. More specifically, when there are still available physical erasing units in the replacement area 608 and the physical erasing units of the data area 602 are damaged, the memory management circuit 502 gets the available physical erasing units from the replacement area 608 for replacing the damaged physical erasing units.

Particularly, the numbers of the physical erasing units in the data area 602, the spare area 604, the system area 606 and the replacement area 608 may be different from one another according to the different memory specifications. In addition, it should be understood that, during operations of the memory storage device 10, grouping relations of the physical erasing units with respect to the data area 602, the spare area 604, the system area 606, and the replacement area 608 may be dynamically changed. For instance, when the damaged physical erasing units in the spare area 604 are replaced by the physical erasing units in the replacement area 608, the physical erasing units originally from the replacement area 608 are then associated with the spare area 604.

Referring to FIG. 7, the memory control circuit unit 404 (or the memory management circuit 502) is configured with logical units LBA(0) to LBA(H) for mapping the physical erasing units of the data area 602, wherein each of the logical units has a plurality of logical sub units for mapping to the corresponding physical programming units of the physical erasing units. Further, when the host system 11 intends to write the data into the logical units or update the data stored in the logical units, the memory control circuit unit 404 (or the memory management unit 502) may get one physical erasing units from the spare area 604 for writing the data as an alternately exchange of the physical erasing units of the data area 602. In this exemplary embodiment, the logical sub-units may be logical pages or logical sectors.

In order to identify which of the physical erasing units is stored with the data of each logical unit, the memory control circuit unit 404 (or the memory management circuit 502) may record the mapping relations between the logical units and the physical erasing units in the present exemplary embodiment. Further, when the host system 11 intends to access the data in the logical sub-unit, the memory control circuit unit 404 (or the memory management circuit 502) confirms the logical unit to which the logical sub-unit belongs, and accesses the data in the physical erasing unit mapped to said logical unit. For instance, in the present exemplary embodiment, the memory control circuit unit 404 (or the memory management circuit 502) may store a logical address-physical address mapping table into the rewritable non-volatile memory module 406 for recording the physical erasing units mapped to each of the logical units, and the logical address-physical address mapping table is loaded into the buffer memory 508 for maintenance when the memory control circuit unit 404 (or the memory management circuit 502) intends to the access the data.

It should be noted that, the mapping table cannot record the mapping relation for all of the logical units because a capacity of the buffer memory 508 is limited. Therefore, in the present exemplary embodiment, the memory control circuit unit 404 (or the memory management unit 502) groups the logical units LBA(0) to LBA(H) into a plurality of logical zones LZ(0) to LZ(M), and configures one logical address-physical address mapping table for each of the logical zones. In particular, when the memory control circuit unit 404 (or the memory management unit 502) intends to update the mapping table for one specific logical unit, the logical address-physical address mapping table of the logical zone to which the logical unit belongs is correspondingly loaded into the buffer memory 508 for updating.

According to another exemplary embodiment, the control instructions of the memory management circuit 502 may also be stored into a specific area (for example, a system area in the memory module exclusively used for storing the system data) of the rewritable non-volatile memory module 406 as program codes. In addition, the memory management circuit 502 has a microprocessor unit (not illustrated), a ROM (not illustrated) and a RAM (not illustrated). Particularly, the ROM has a boot code, which is performed by the microprocessor unit to load the control instructions stored in the rewritable non-volatile memory module 406 to the RAM of the memory management circuit 502 when the memory control circuit unit 404 is enabled. Thereafter, the control instructions are performed by the microprocessor unit to write, read or erase data.

Further, in another exemplary embodiment, the control instructions of the memory management circuit 502 may also be implemented in a form of hardware. For example, the memory management circuit 502 includes a microprocessor, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the microprocessor. The memory management circuit is configured to manage the physical erasing units of the rewritable non-volatile memory module 406; the memory writing circuit is configured to issue a write command to the rewritable non-volatile memory module 406 in order to write data into the rewritable non-volatile memory module 406; the memory reading circuit is configured to issue a read command to the rewritable non-volatile memory module 406 in order to read data from the rewritable non-volatile memory module 406; the memory erasing circuit is configured to issue an erase command to the rewritable non-volatile memory module 406 in order to erase data from the rewritable non-volatile memory module 406; the data processing circuit is configured to process both the data to be written to the rewritable non-volatile memory module 406 and the data to be read from the rewritable non-volatile memory module 406.

Referring back to FIG. 5, the host interface 504 is coupled to the memory management circuit 502 and configured to couple to the connection interface unit 402, so as to receive and identify commands and data sent from the host system 11. In other words, the commands and data sent from the host system 11 are passed to the memory management circuit 502 through the host interface 504. In the present exemplary embodiment, the host interface 504 is compatible with the SATA standard. However, it should be understood that the invention is not limited thereto, and the host interface 504 may also be compatible with a PATA standard, an IEEE 1394 standard, a PCI Express standard, a USB standard, a UHS-I standard, a UHS-II standard, a SD standard, a MS standard, a MMC standard, a CF standard, an IDE standard, or other suitable standards for data transmission.

The memory interface 506 is coupled to the memory management circuit 502 and configured to access the rewritable non-volatile memory module 406. That is, data to be written to the rewritable non-volatile memory module 406 is converted to a format acceptable to the rewritable non-volatile memory module 406 through the memory interface 506.

The buffer memory 508 is coupled to the memory management circuit 502 and configured to temporarily store data and commands from the host system 11 or data from the rewritable non-volatile memory module 406.

The power management unit 510 is coupled to the memory management circuit 502 and configured to control a power of the memory storage device 10.

The error checking and correcting circuit 512 is coupled to the memory management circuit 502 and is configured to perform an error checking and correcting process to ensure the correctness of data. Specifically, when the memory management circuit 502 receives a write command from the host system 11, the error checking and correcting circuit 512 generates an error checking and correcting code (ECC code) for data corresponding to the write command, and the memory management circuit 502 writes data and the ECC code corresponding to the write command to the rewritable non-volatile memory module 406. Subsequently, when the memory management circuit 502 reads the data from the rewritable non-volatile memory module 406, the error checking and correcting code corresponding to the data is also read, and the error checking and correcting circuit 512 may perform the error checking and correcting procedure for the read data according to the error checking and correcting code.

Figure 8:
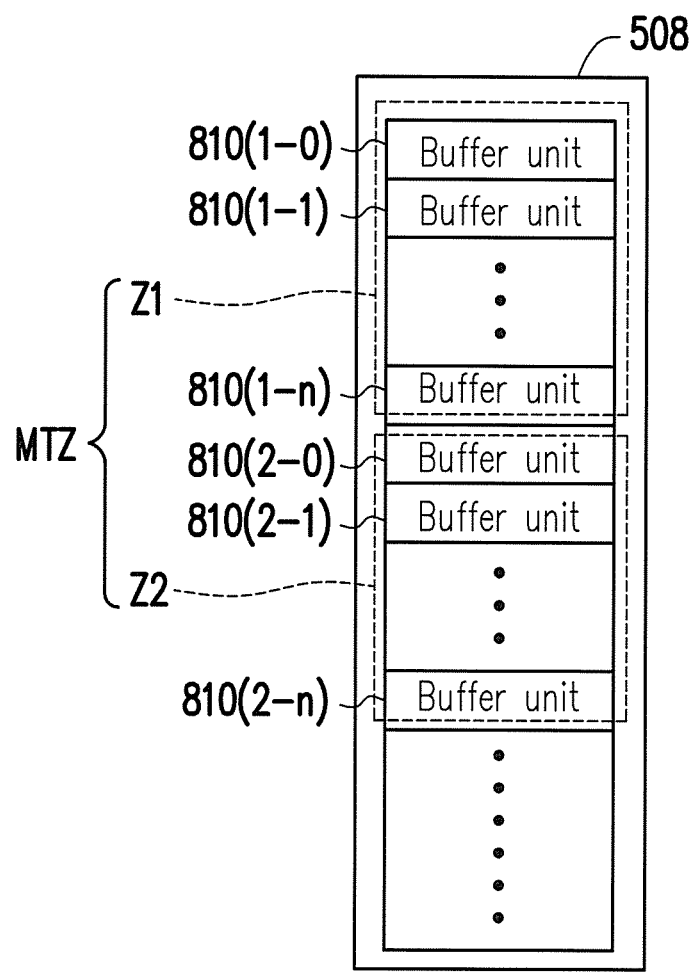
FIG. 8 is a schematic diagram illustrating a buffer memory according to an exemplary embodiment.

FIG. 8 is a schematic diagram illustrating a buffer memory according to an exemplary embodiment.

Referring to FIG. 8, in the present exemplary embodiment, the memory control circuit unit 404 (or the memory management unit 502) allocates a mapping table zone MTZ in the buffer memory 508 for temporarily storing logical address-physical address mapping tables loaded from the rewritable non-volatile memory module 406. Particularly, the memory control circuit unit 104 (or the memory management circuit 502) further divides the mapping table zone MTZ into a first zone Z1 and a second zone Z2, and each of the first zone Z1 and the second zone Z2 has a plurality of continuous buffer units. Each of the buffer units is configured to temporarily store one logical address-physical address mapping table, and each of the buffer units may be marked with different status such as a dirty status, a clean status, an invalid status, a saving status, or a loading status, which are configured to indicate a status of the data in the buffer unit. In the present exemplary embodiment, the size of one logical address-physical address mapping table is 512 B. Therefore, the size of each of the buffer units is 512 B. The sizes of the first zone Z1 and the second zone Z2 may be a fixed value, such as 64 MB or 128 MB. However, it should be understood that, in other exemplary embodiments, the size of the buffer unit may be depend on the actual logical address-physical address mapping table, and the sizes of the first zone Z1 and the second zone Z2 may also be configured based on practical requirements, which are not particularly limited in the invention.

As shown in FIG. 8, the first zone Z1 has buffer units 810(1-0) to 810(1-n), and the second zone Z2 has buffer units 810(2-0) to 810(2-n). In the present exemplary embodiment, the memory control circuit unit 404 (or the memory management circuit 502) can load a plurality of logical address-physical address mapping tables from the rewritable non-volatile memory module 406 into the mapping table zone MTZ in the buffer memory 508 in advance, and temporarily store the logical address-physical address mapping tables respectively into the buffer units in the first zone Z1 and the second zone Z2.

FIG. 9A to FIG. 9F are schematic diagrams illustrating a buffer memory management method according to an exemplary embodiment.

Figure 9A:
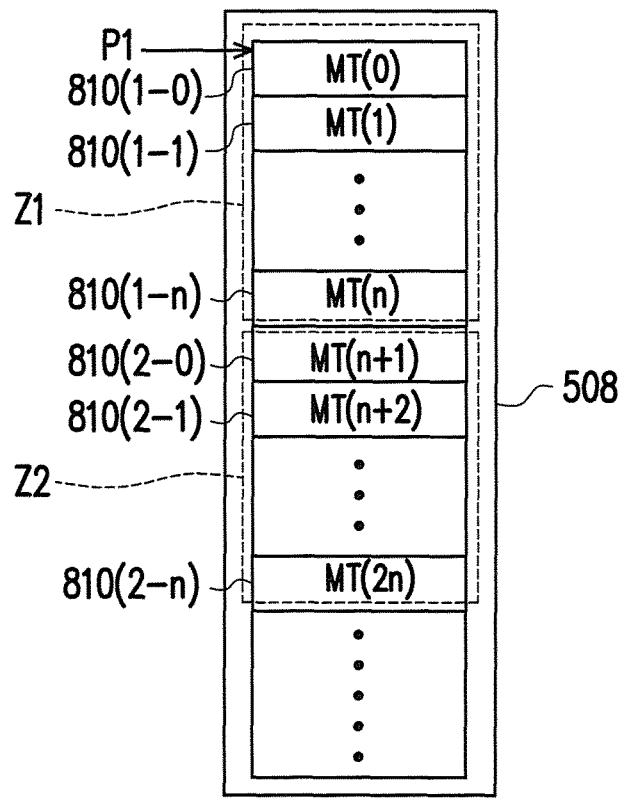
FIG. 9A to FIG. 9F are schematic diagrams illustrating a buffer memory management method according to an exemplary embodiment.

Referring to FIG. 9A, logical address-physical address mapping tables MT(0) to MT(n) are temporarily stored into the buffer units 810(1-0) to 810(1-n) in the first zone Z1 respectively, and logical address-physical address mapping tables MT(n+1) to MT(2n) are temporarily stored into the buffer units 810(2-0) to 810(2-n) in the second zone Z2 respectively. For illustrative convenience, the present exemplary embodiment is described starting with the condition where the buffer units in the first zone Z1 and the second zone Z2 are not marked as the dirty status. When a write command is received from the host system 11 and the write command instructs writing write data into a logical address, the memory control circuit unit 404 (or the memory management circuit 502) temporarily stores the logical address-physical address mapping table to which said logical address belongs into the first zone Z1 of the mapping table zone MTZ for maintenance. More specifically, the memory control circuit unit 404 (or the memory management circuit 502) first determines whether the logical address-physical address mapping table to which the logical address to be written belongs is already temporarily stored into the buffer unit in the first zone Z1 or the second zone Z2.

In the present exemplary embodiment, the memory control circuit unit 404 (or the memory management circuit 502) sets an update area to temporarily store the updated logical address-physical address mapping tables. In the present exemplary embodiment, when power on the memory storage device 10, the memory control circuit unit 404 (or the memory management circuit 502) sets the update area as the first zone Z1. In another exemplary embodiment, the memory control circuit unit 404 (or the memory management circuit 502) may also by default set the update area as the second zone Z2.

When a write command instructing writing data into a logical address belonging to a logical address-physical address mapping table MT(n+2) is received from the host system, the memory control circuit unit 404 (or the memory management circuit 502) determines that the logical address-physical address mapping table MT(n+2) is loaded into the mapping table zone MTZ in the buffer memory 508, and temporarily stored into the buffer unit 810(2-1). Accordingly, the memory control circuit unit 404 (or the memory management circuit 502) writes the data into the physical programming unit mapped to the logical address in the rewritable non-volatile memory module 406 and updates the logical address-physical address mapping table MT(n+2) temporarily stored in the buffer unit 810(2-1). Next, the memory control circuit unit 404 (or the memory management circuit 502) moves the updated logical address-physical address mapping table MT(n+2) from the buffer unit 810(2-1) in the second zone Z2 to the first zone Z1 currently set as the update area.

In the present exemplary embodiment, the memory control circuit unit 104 (or the memory management circuit 202) further sets a first pointer P1 to point one of the buffer units in the first zone Z1, and the pointed buffer unit is not marked as the dirty status. Specifically, the memory control circuit unit 104 (or the memory management circuit 202) determines whether the pointed buffer unit is not marked as the dirty status according to a precedence of the buffer units in the first zone Z1 in sequence from front to back. As shown in FIG. 9A, since all the buffer units in the first zone Z1 are not marked as the dirty status, the memory control circuit unit 404 (or the memory management circuit 502) sets the first pointer P1 to point the first buffer unit 810(1-0) in the first zone Z1. Thereafter, the memory control circuit unit 404 (or the memory management circuit 502) stores the updated logical address-physical address mapping table according to the first pointer P1. For example, the memory control circuit unit 404 (or the memory management circuit 502) moves the updated logical address-physical address mapping table MT(n+2) from the buffer unit 810(2-1) in the second zone Z2 to the buffer unit 810(1-0) in the first zone Z1 according to the first pointer P1.

Figure 9B:
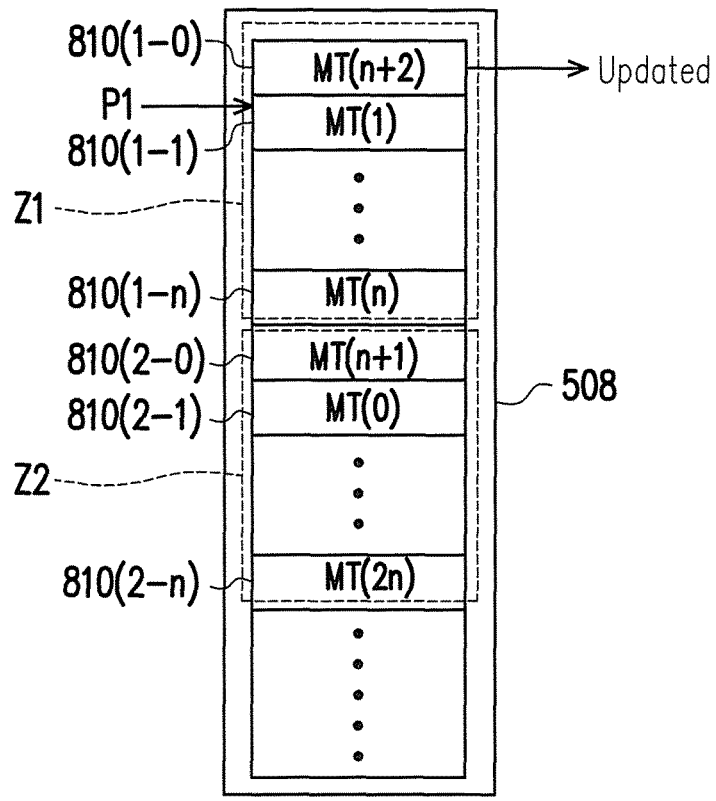

Referring to FIG. 9B, after moving the updated logical address-physical address mapping table MT(n+2) into the buffer unit 810(1-0) in the first zone Z1, the memory control circuit unit 404 (or the memory management circuit 502) marks the buffer unit 810(1-0) as the dirty status. Moreover, the memory control circuit unit 404 (or the memory management circuit 502) sets the first pointer P1 to point the buffer unit that is next to the buffer unit 810(1-0) in the first zone Z1 and not marked as the dirty status. In the present exemplary embodiment, a buffer unit 810(1-1) next to the buffer unit 810(1-0) is not marked as the dirty status. Accordingly, the memory control circuit unit 404 (or the memory management circuit 502) sets the first pointer P1 to point the buffer unit 810(1-1). In the present exemplary embodiment, the memory control circuit unit 404 (or the memory management circuit 502) further can move the logical address-physical address mapping table MT(0) originally stored temporarily in the buffer unit 810(1-0) in the first zone Z1 into the buffer unit 810(2-1) in the second zone Z2. In another exemplary embodiment, it is also possible that the logical address-physical address mapping table MT(0) is not moved but directly overwritten.

Figure 9C:
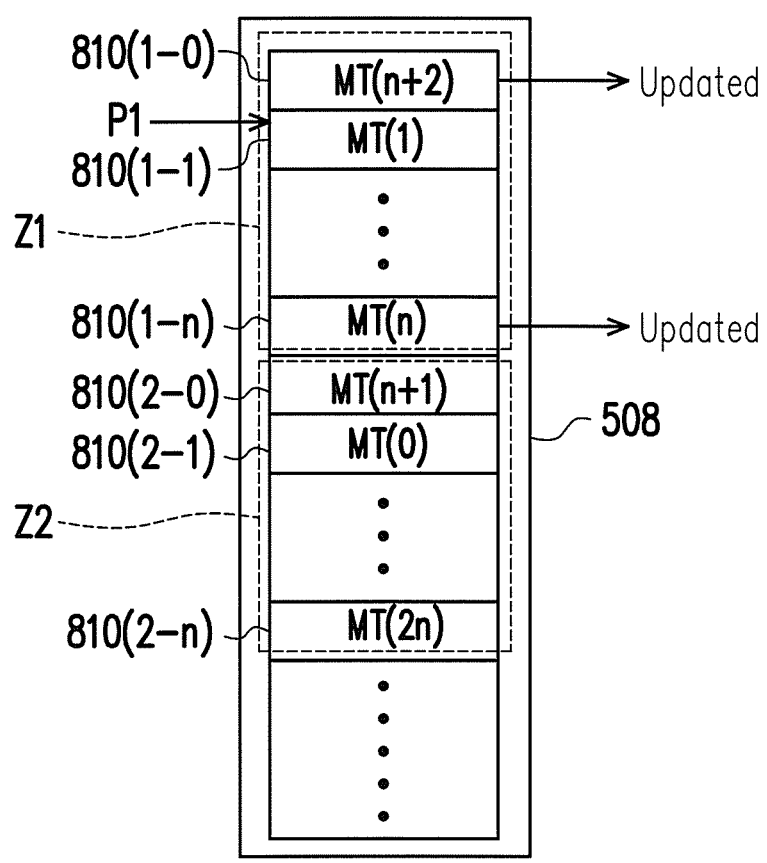

At this time, when another write command which instructs writing data into a logical address belonging to a logical address-physical address mapping table MT(n) is received from the host system, the memory control circuit unit 404 (or the memory management circuit 502) may determine that the logical address-physical address mapping table MT(n) is already loaded into the mapping table zone MTZ in the buffer memory 508 and temporarily stored in the buffer unit 810(1-*n*) in the first zone Z1. As shown in FIG. 9C, the memory control circuit unit 404 (or the memory management circuit 502) writes data into the physical programming unit mapped to the logical address in the rewritable non-volatile memory module 406, updates the logical address-physical address mapping table MT(n) temporarily stored in the buffer unit 810(1-*n*), and marks the buffer unit 810(1-*n*) as the dirty status.

Figure 9D:
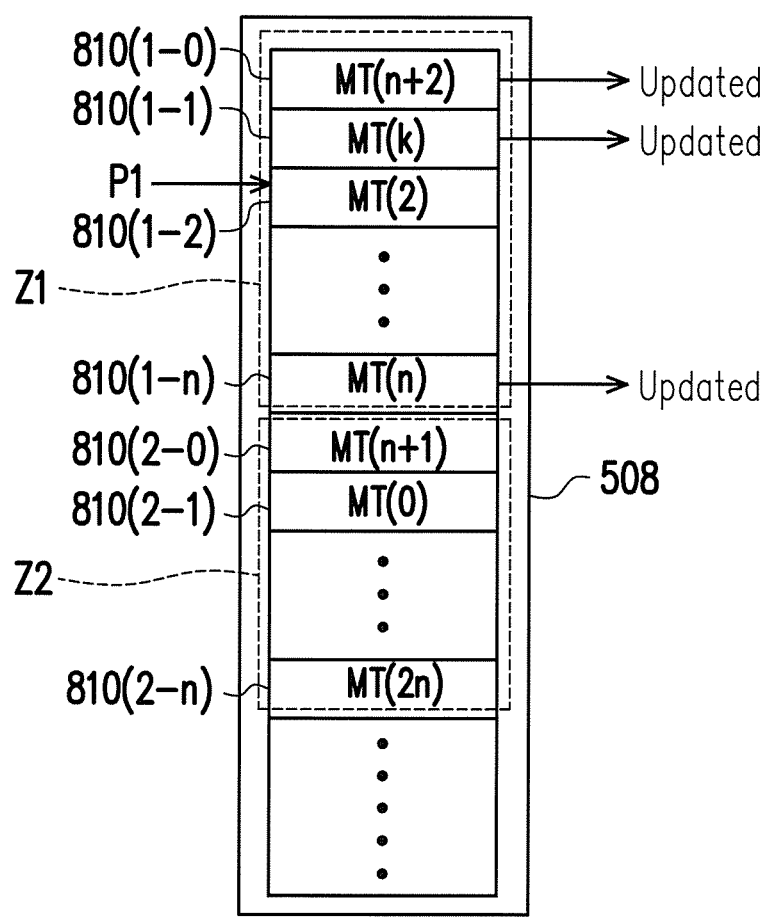

Now, when another write command which instructs writing data into a logical address belonging to a logical address-physical address mapping table MT(k) is received from the host system, the memory control circuit unit 404 (or the memory management circuit 502) may determine that the logical address-physical address mapping table MT(k) is not yet loaded into the mapping table zone MTZ in the buffer memory 508. Accordingly, the memory control circuit unit 404 (or the memory management circuit 502) loads the logical address-physical address mapping table MT(k) from the rewritable non-volatile memory module 406 into the mapping table zone MTZ, and uses the buffer unit 810(1-1) in the first zone Z1 pointed by the first pointer P1 to temporarily store the logical address-physical address mapping table MT(k). As shown in FIG. 9D, the logical address-physical address mapping table MT(k) is temporarily stored into the buffer unit 810(1-1) in the first zone Z1, and the memory control circuit unit 404 (or the memory management circuit 502) writes the data into the rewritable non-volatile memory module 406. Moreover, the memory control circuit unit 404 (or the memory management circuit 502) also updates the logical address-physical address mapping table MT(k), and marks the buffer unit 810(1-1) as the dirty status. Furthermore, the memory control circuit unit 404 (or the memory management circuit 502) selects the buffer unit 810(1-2) that is next to the buffer unit 810(1-1) and not marked as the dirty status in the first zone Z1 for temporarily storing the next updated logical address-physical address mapping table, and sets the first pointer P1 to point the buffer unit 810(1-2).

In the present exemplary embodiment, when all the buffer units 810(1-0) to 810(1-*n*) in the first zone Z1 are marked as the dirty status, the memory control circuit unit 404 (or the memory management circuit) activates a restore operation to restore the logical address-physical address mapping tables temporarily stored in the all the buffer units 810(1-0) to 810(1-*n*) in the first zone Z1 back to the rewritable non-volatile memory module 406. However, it should be understood that the memory control circuit unit 404 (or the memory management circuit 502) also activates the restore operation at another time. For example, before performing background operations such as garbage collection, or before power for the memory storage device is cut off, or an amount of time has passed before receiving write command from the host system 11, the memory control circuit unit 404 (or the memory management circuit 502) also activates the restore operation to restore the updated logical address-physical address mapping table to the rewritable non-volatile memory module 406.

Figure 9E:
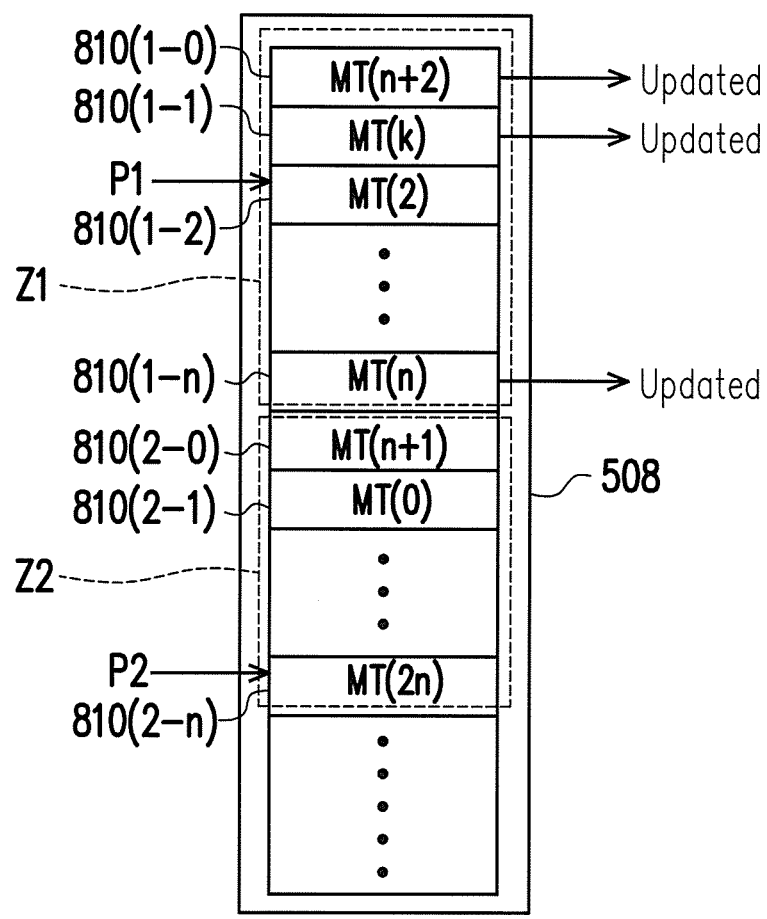

In the present exemplary embodiment, the memory control circuit unit 404 (or the memory management circuit 502) further sets a second pointer P2 to point one of the buffer units in the second zone Z2. Specifically, the memory control circuit unit 404 (or the memory management circuit 502) determines the buffer unit to be pointed by the second pointer P2 according to a precedence of the buffer units in the second zone Z2 in sequence from back to front. As shown in FIG. 9E, beginning with a last one of the buffer units in the second zone Z2 (i.e., **810(2-*n*)), the second pointer P2 is set to point the buffer unit 810(2-*n*)**).

Figure 9F:
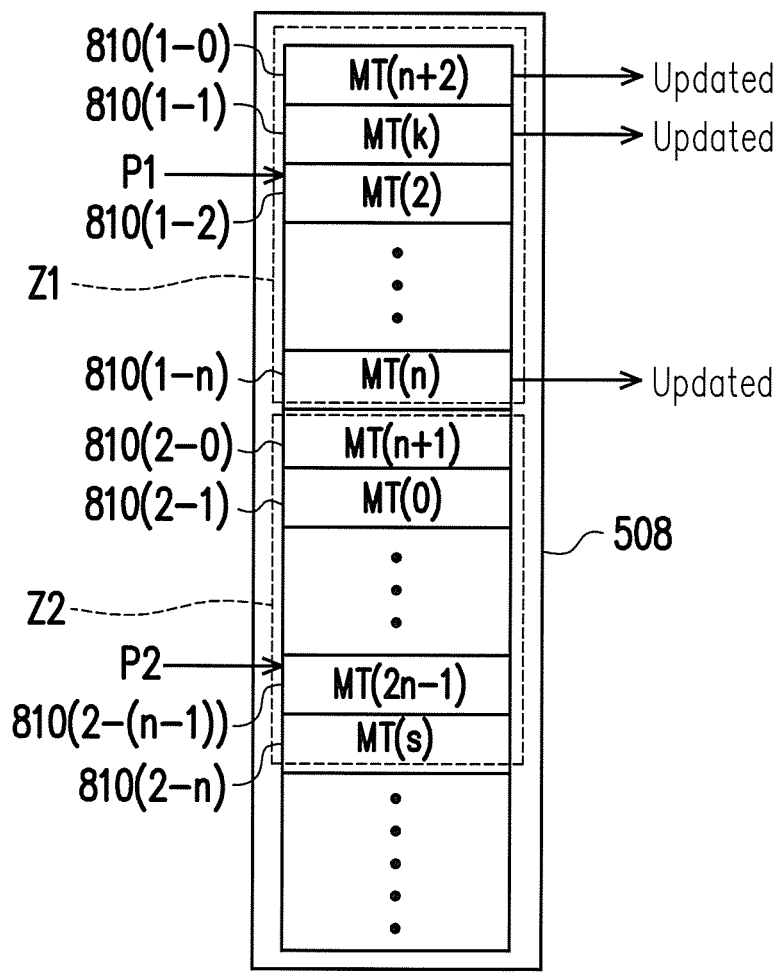

Now, when a read command which instructs reading data of a logical address belonging to a logical address-physical address mapping table MT(s) is received from the host system, the memory control circuit unit 404 (or the memory management circuit 502) may determine that the logical address-physical address mapping table MT(s) is not yet loaded into the mapping table zone MTZ in the buffer memory 508. Accordingly, the memory control circuit unit 404 (or the memory management circuit 502) loads the logical address-physical address mapping table MT(s) from the rewritable non-volatile memory module 406 into the mapping table zone MTZ, and uses the buffer unit **810(2-*n*) pointed by the second pointer P1 to temporarily store the logical address-physical address mapping table MT(s). As shown in FIG. 9F, after the logical address-physical address mapping table MT(s) is temporarily stored into the buffer unit 810(2-*n*) in the second zone Z2, the memory control circuit unit 404 (or the memory management circuit 502) may then read the data stored in the rewritable non-volatile memory module according to the logical address-physical address mapping table MT(s). Moreover, the memory control circuit unit 404 (or the memory management circuit 502) also sets the second pointer P2 to point the buffer unit previous to the buffer unit 810(2-*n*) in the second zone Z2 (i.e., the buffer unit 810(2-(*n*−1))). In the present exemplary embodiment, when the second pointer P2 points the first one of the buffer unit in the second zone Z2 (i.e., 810(2-0)), the memory control circuit unit 404 (or the memory management circuit 502) may select a last one of the buffer units in the second zone Z2 (i.e., 810(2-*n*)**) as the next buffer unit to be pointed by the second pointer P2.

Now, when another read command which instructs reading data of a logical address belonging to a logical address-physical address mapping table MT(n+1) is received from the host system, the memory control circuit unit 404 (or the memory management circuit 502) may determine that the logical address-physical address mapping table MT(n+1) has already been loaded into the mapping table zone MTZ in the buffer memory 508, and temporarily stored into the buffer unit 810(2-0) in the second zone Z2. As shown in FIG. 9F, the memory control circuit unit 404 (or the memory management circuit 502) directly reads the data in the rewritable non-volatile memory module 406 according to the logical address-physical address mapping table MT(n+1) temporarily stored in the buffer unit 810(2-0) in the second zone Z2.

FIGS. 10A to 10D are schematic diagrams illustrating a buffer memory management method according to another exemplary embodiment. FIGS. 10A to 10D relate a buffer memory management method when a write command is received during a period in which the restore operation is performed in the first zone Z1.

Figure 10A:
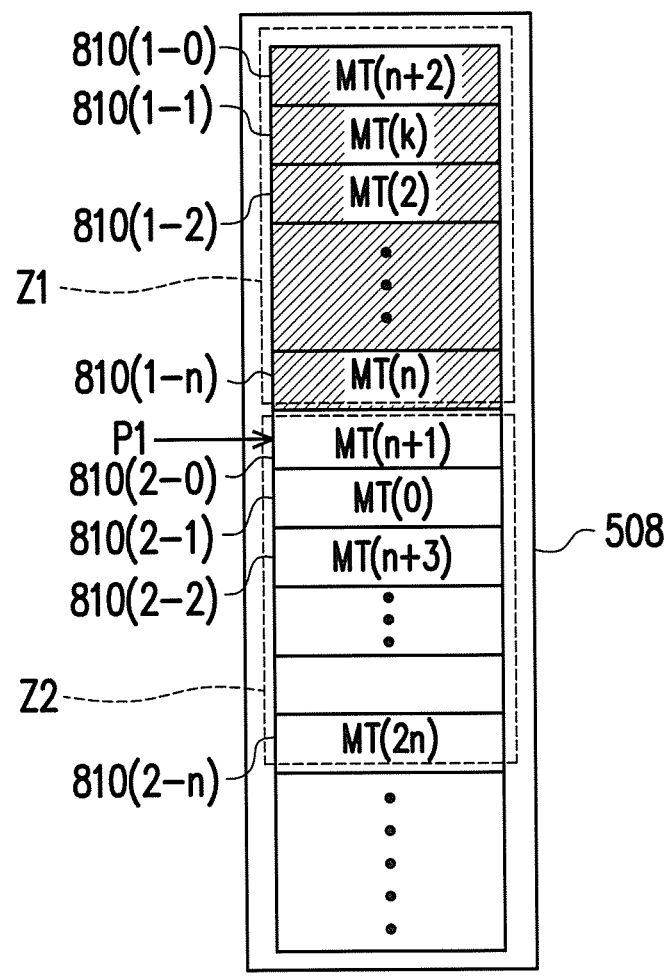
FIG. 10A to FIG. 10D are schematic diagrams illustrating a buffer memory management method according to another exemplary embodiment.

Refer to FIG. 10A, in the present exemplary embodiment, when all the buffer units 810(1-0) to **810(1-*n*) in the first zone Z1 which is set as an update area are marked as the dirty status, the memory control circuit unit 404 (or the memory management circuit 502) activates a restore operation, so as to restore the logical address-physical address mapping tables temporarily stored in the first zone Z1 back to the rewritable non-volatile memory module. However, the memory control circuit unit 404 (or the memory management circuit 502) also activates a restore operation at another time as explained above and will not be repeated here. Moreover, while activating the restore operation to restore the logical address-physical address mapping tables stored in the first zone Z1 to the rewritable non-volatile memory module, the memory control circuit unit 404 (or the memory management circuit 502) resets the update area as a second zone Z2. Accordingly, when receiving the write command from the host system 11, the memory control circuit unit 404 (or the memory management circuit 502) temporarily stores the logical address-physical address mapping tables to be updated to the second zone Z2 of the mapping table zone MTZ (i.e., the update area) according to the write command received for maintenance. In the present exemplary embodiment, the memory control circuit unit 104 (or the memory management circuit 202) sets a first pointer P1 to point one of the buffer units in the second zone Z2, and the pointed buffer unit is not marked as the dirty status. As shown in FIG. 10A, because all the buffer units in the second zone Z2 are not marked as the dirty status, the memory control circuit unit 404 (or the memory management circuit 502) sets the first pointer P1 to point a first one of the buffer unit 810(2-0)** in the second zone Z2.

Figure 10B:
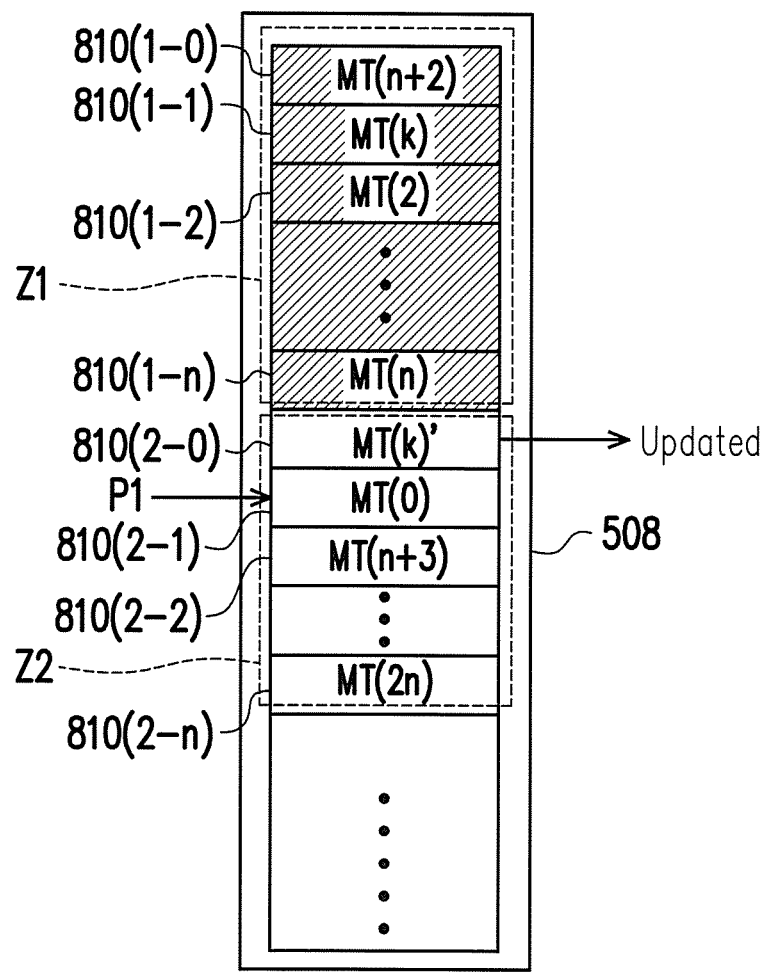

When a write command which instructs writing data (hereinafter also referred to as the first data) into a logical address of a logical address-physical address mapping table MT(k) (hereinafter referred to as the first logical address-physical address mapping table) (the write command is hereinafter referred to as the first write command) is received from the host system 11 during the restore operation, the memory control circuit unit 404 (or the memory management circuit 502) determines that the logical address-physical address mapping table MT(k) has been loaded in the mapping table zone MTZ in the buffer memory 508, and temporarily stored into the buffer unit 810(1-1) in the first zone Z1 (hereinafter also referred to as the first buffer unit). Now, the memory control circuit unit 404 (or the memory management circuit 502) writes the data into the physical programming unit mapped to the logical address in the rewritable non-volatile memory module 406, copies the logical address-physical address mapping table MT(k) to the second zone Z2 and temporarily stores the logical address-physical address mapping table MT(k) to a buffer unit 810 (2-0) pointed by the first pointer P1 (hereinafter also referred to as the second buffer unit). The memory control circuit unit 404 (or the memory management circuit 502) copies the logical address-physical address mapping table MT(k) as logical address-physical address mapping table MT(k)', and as shown by FIG. 10B, temporarily stores the logical address-physical address mapping table MT(k)' to the buffer unit 810(2-0) in the second zone Z2. Also, the memory control circuit unit 404 (or the memory management circuit 502) updates the logical address-physical address mapping table MT(k)' temporarily stored in the buffer unit 810 (2-0) in the second zone Z2, and marks the buffer unit 810(2-0) as dirty status. Moreover, the memory control circuit unit 404 (or the memory management circuit 502) sets the first pointer P1 to point the buffer unit that is next to the buffer unit 810(2-0) in the second zone Z2 and not marked as the dirty status. In the present exemplary embodiment, a buffer unit 810(2-1) next to the buffer unit 810(2-0) is not marked as the dirty status. Accordingly, the memory control circuit unit 404 (or the memory management circuit 502) sets the first pointer P1 to point the buffer unit 810(2-1).

Figure 10C:
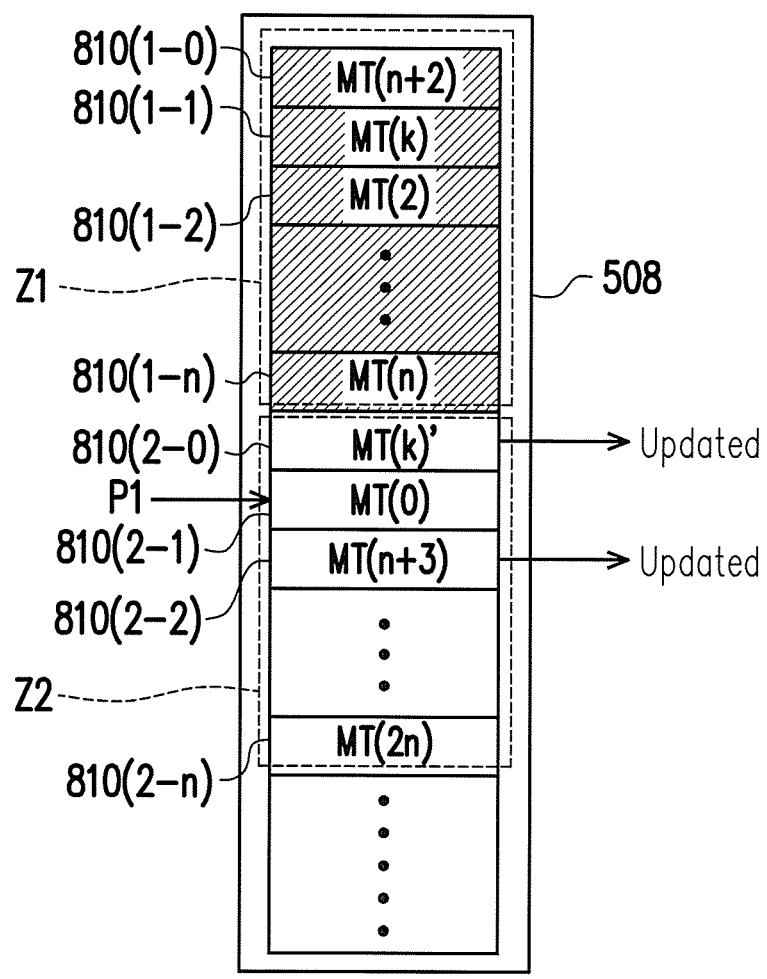

Now, when another write command (hereinafter referred to as the second write command) which instructs writing data (hereinafter also referred to as the second data) into a logical address of a logical address-physical address mapping table MT(n+3) (hereinafter referred to as the second logical address-physical address mapping table) is received from the host system, the memory control circuit unit 404 (or the memory management circuit 502) determines that the logical address-physical address mapping table MT(n+3) has been loaded in the mapping table zone MTZ in the buffer memory 508, and temporarily stored into the buffer unit 810(2-2) in the second zone Z2 (hereinafter also referred to as the third buffer unit). As shown in FIG. 10C, the memory control circuit unit 404 (or the memory management circuit 502) writes data into the physical programming unit mapped to the logical address in the rewritable non-volatile memory module 406, updates the logical address-physical address mapping table MT(n+3), and marks the buffer unit 810(2-2) as the dirty status.

Figure 10D:
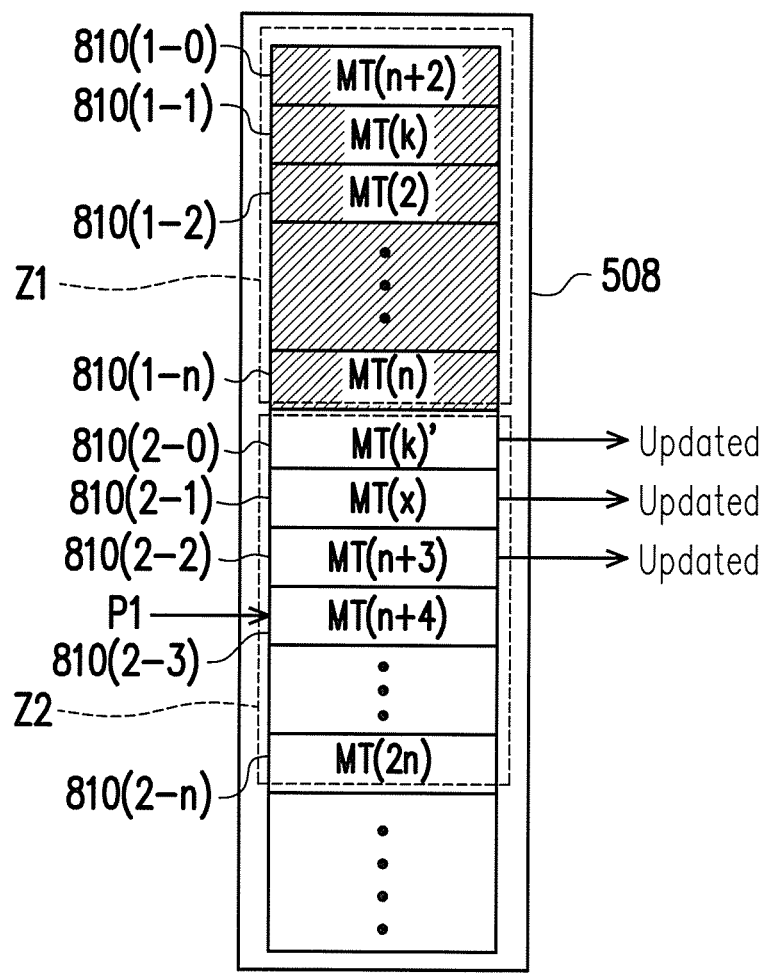

Now, when yet another write command (hereinafter referred to as the third write command) which instructs writing data (hereinafter also referred to as the third data) into a logical address of a logical address-physical address mapping table MT(x) (hereinafter referred to as the third logical address-physical address mapping table) is received from the host system, the memory control circuit unit 404 (or the memory management circuit 502) determines the logical address-physical address mapping table MT(x) is not yet loaded to the mapping table zone MTZ of the buffer memory 508. Accordingly, the memory control circuit unit 404 (or the memory management circuit 502) loads the logical address-physical address mapping table MT(x) from the rewritable non-volatile memory module 406 into the mapping table zone MTZ, and uses the buffer unit 810(2-1) in the second zone Z2 pointed by the first pointer P1 to temporarily store the logical address-physical address mapping table MT(x). As shown in FIG. 10D, the logical address-physical address mapping table MT(x) is temporarily stored into the buffer unit 810(2-1) in the second zone Z2 (hereinafter referred to as the fourth buffer unit), and the memory control circuit unit 404 (or the memory management circuit 502) writes the data into the rewritable non-volatile memory module 406. Moreover, the memory control circuit unit 404 (or the memory management circuit 502) also updates the logical address-physical address mapping table MT(x), and marks the buffer unit 810(2-1) as the dirty status.

Furthermore, the memory control circuit unit 404 (or the memory management circuit 502) selects a buffer unit that is next to the buffer unit 810(2-1) in the second zone Z2 and not marked as the dirty status in order to set a first pointer P1. In the present exemplary embodiment, the memory control circuit unit 404 (or the memory management circuit 502) determines the buffer unit 810(2-2) next to the buffer unit 810(2-1) is marked as the dirty status in sequence. Accordingly, the memory control circuit unit 404 (or the memory management circuit 502) searches for buffer units not marked as the dirty status in sequence from front to back. Next, the memory control circuit unit 404 (or the memory management circuit 502) determines the buffer unit 810(2-3) next to the second buffer unit 810(2-2) is not marked as the dirty status, sets the first pointer P1 to point the buffer unit 810(2-3).

In the present exemplary embodiment, when the restore operation in the first zone Z1 is complete, that is, when the memory control circuit unit 404 (or the memory management circuit 502) already stored all the logical address-physical address mapping tables in the buffer units 810(1-0) to 810(1-n) in the first zone Z1 to the rewritable non-volatile memory module, the memory control circuit unit 404 (or the memory management circuit 502) marks the buffer units 810(1-0) to 810(1-n) in the first zone Z1 as clean status. This way, when all the buffer units 810(2-0) to 810(2-n) in the second zone Z2 are marked as the dirty status, the memory control circuit unit 404 (or the memory management circuit 502) activates the restore operation to restore the logical address-physical address mapping tables temporarily stored in the all the buffer units 810(2-0) to 810(2-n) in the second zone Z2 back to the rewritable non-volatile memory module 406, and at the same time set the update area as the first zone Z1, so as to continue to receive write commands from the host system and perform write operations. Additionally, in another exemplary embodiment of the invention, the memory control circuit unit 404 (or the memory management unit 502) also allocates another zone having continuous buffer units in the buffer memory 508 for temporarily storing logical address-physical address mapping tables, but the invention is not limited thereto.

Figure 11A:
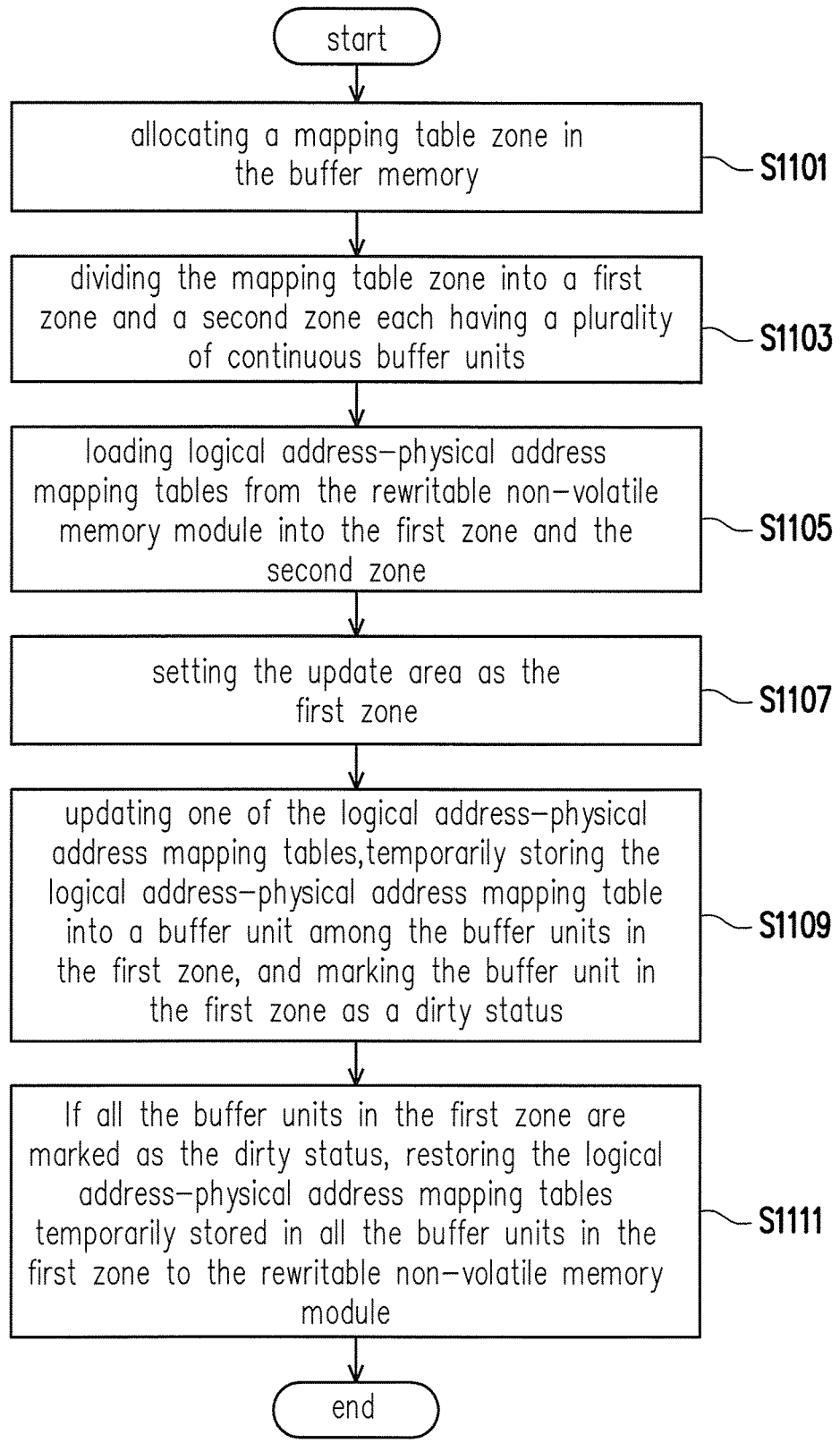
FIGS. 11A and 11B are flowcharts illustrating a buffer memory management method according to an embodiment.
Figure 11B:
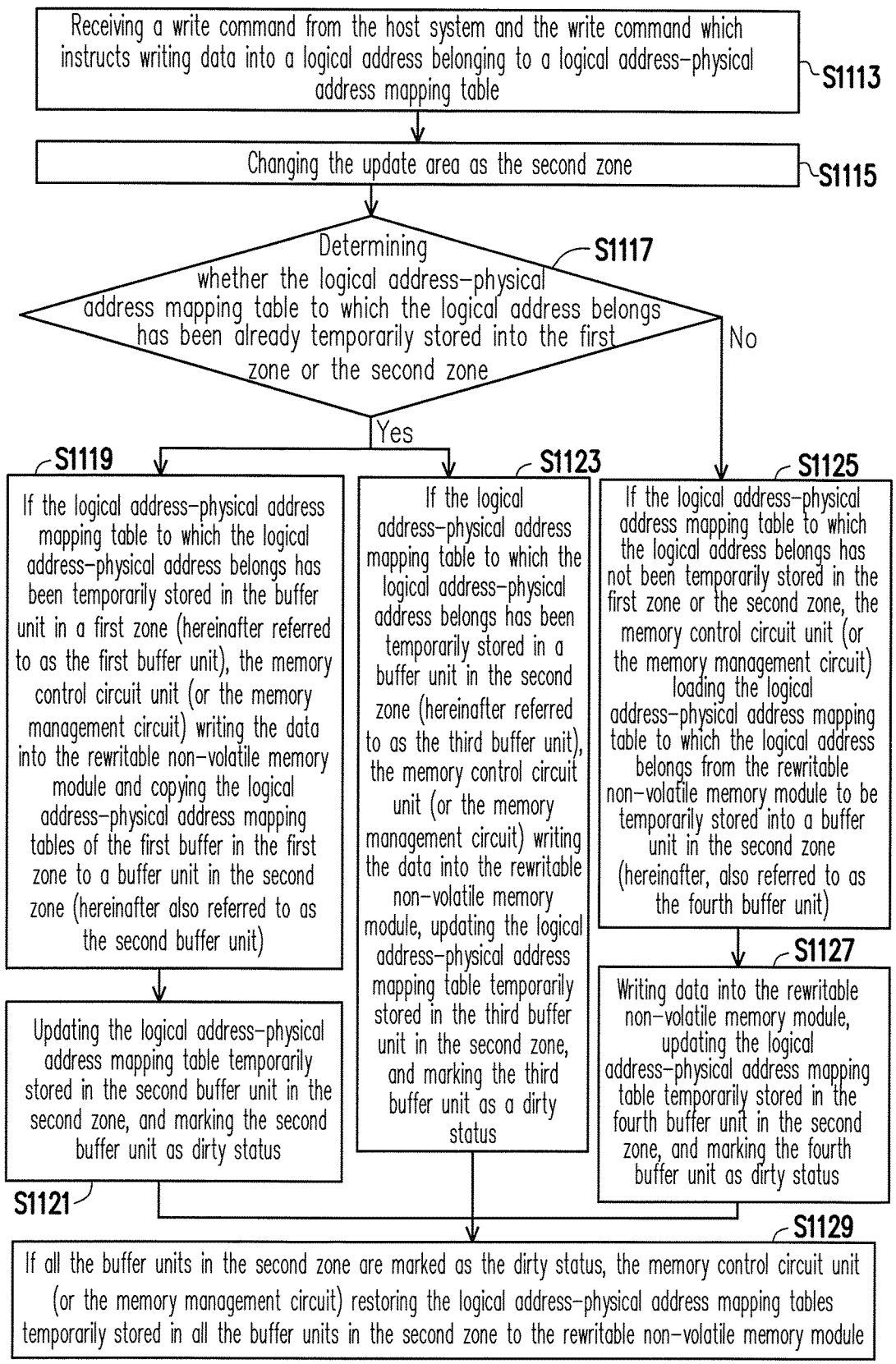

FIGS. 11A and 11B are flowcharts illustrating a buffer memory management method according to an embodiment.

Referring to FIG. 11A, step S1101, the memory control circuit unit 404 (or the memory management circuit 502) allocates a mapping table zone in the buffer memory 508.

In step S1103, the memory control circuit unit 404 (or the memory management circuit 502) divides the mapping table zone into a first zone and a second zone each having a plurality of continuous buffer units.

In step S1105, the memory control circuit unit 404 (or the memory management circuit 502) loads logical address-physical address mapping tables from the rewritable non-volatile memory module into the first zone and the second zone. As described above, each of the loaded logical address-physical address mapping tables is temporarily stored into one of the buffer units in the first zone or one of the buffer units in the second zone.

In step S1107, the memory control circuit unit 404 (or the memory management circuit 502) sets the update area as the first zone.

In step S1109, the memory control circuit unit 404 (or the memory management circuit 502) updates one of the logical address-physical address mapping tables, temporarily stores the logical address-physical address mapping table into a buffer unit among the buffer units in the first zone, and marks the buffer unit in the first zone as a dirty status. More particularly, the memory control circuit unit 404 (or the memory management circuit 502) updates logical address-physical address mapping tables according to write commands received from the host system 11. Above embodiments already explained related operation methods of this embodiment and are not repeated here.

In step S1111, if all the buffer units in the first zone are marked as the dirty status, the memory control circuit unit 404 (or the memory management circuit 502) restores the logical address-physical address mapping tables temporarily stored in all the buffer units in the first zone to the rewritable non-volatile memory module. However, the memory control circuit unit 404 (or the memory management circuit 502) also activates a restore operation at another time as explained above and will not be repeated here.

If while the logical address-physical address mapping tables stored in all the buffer units in the first zone Z1 are being restored to the rewritable non-volatile memory module, a write command from the host system 11 is received, the process in FIG. 11B is separately performed.

Referring to FIG. 11B, in step S1113, the memory control circuit unit 404 (or the memory management circuit 502) receives a write command from the host system and the write command which instructs writing data into a logical address belonging to a logical address-physical address mapping table.

In step S1115, the memory control circuit unit 404 (or the memory management circuit 502) changes the update area as the second zone.

In step S1117, the memory control circuit unit 404 (or the memory management circuit 502) determines whether the logical address-physical address mapping table to which the logical address belongs has been already temporarily stored into the first zone or the second zone.

In step S1119, if the logical address-physical address mapping table to which the logical address-physical address belongs has been temporarily stored in the buffer unit in a first zone (hereinafter referred to as the first buffer unit), the memory control circuit unit 404 (or the memory management circuit 502) writes the data into the rewritable non-volatile memory module, and copy the logical address-physical address mapping tables of the first buffer in the first zone to a buffer unit in the second zone (hereinafter also referred to as the second buffer unit).

In step S1121, the memory control circuit unit 404 (or the memory management circuit 502) updates the logical address-physical address mapping table temporarily stored in the second buffer unit in the second zone, and marks the second buffer unit as dirty status.

In step S1123, if the logical address-physical address mapping table to which the logical address-physical address belongs has been temporarily stored in a buffer unit in the second zone (hereinafter referred to as the third buffer unit), the memory control circuit unit 404 (or the memory management circuit 502) writes the data into the rewritable non-volatile memory module, updates the logical address-physical address mapping table temporarily stored in the third buffer unit in the second zone, and marks the third buffer unit as a dirty status.

in step S1125, if the logical address-physical address mapping table to which the logical address belongs has not been temporarily stored in the first zone or the second zone, the memory control circuit unit 404 (or the memory management circuit 502) loads the logical address-physical address mapping table to which the logical address belongs from the rewritable non-volatile memory module to be temporarily stored into a buffer unit in the second zone (hereinafter, also referred to as the fourth buffer unit).

In step S1127, the memory control circuit unit 404 (or the memory management circuit 502) writes data into the rewritable non-volatile memory module, updates the logical address-physical address mapping table temporarily stored in the fourth buffer unit in the second zone, and marks the fourth buffer unit as dirty status.

In step S1129, if all the buffer units in the second zone are marked as the dirty status, the memory control circuit unit 404 (or the memory management circuit 502) restores the logical address-physical address mapping tables temporarily stored in all the buffer units in the second zone to the rewritable non-volatile memory module. However, the memory control circuit unit 404 (or the memory management circuit 502) also activates a restore operation at another time as explained above and will not be repeated here.

In summary, in the buffer memory management method, the memory control circuit unit and the memory storage device provided by the invention, specific zones having continuous buffer units are allocated in the buffer memory, and an update area is set as a specific area, so as to collect and temporarily store updated logical address-physical address mapping tables to the update area. Accordingly, when intending to restore the updated logical address-physical address mapping tables in the buffer memory to the rewritable non-volatile memory module, the updated logical address-physical address mapping tables may be directly written into the physical programming unit from the update area according to the size of the physical programming unit without additionally performing the copying and collecting operations. Furthermore, by setting the specific area to a specific size, the issue of system overload due to large amount of the data to be processed may be prevented when performing the restore operation, so as to effectively improve a processing speed for the restore operation. Additionally, through the method of changing update areas, while restoring the updated logical address-physical address mapping tables in the buffer memory to the rewritable non-volatile memory module, write commands from the host system can continue to be received and write operations can continue to be performed, thus preventing the issue of failure to write due to prolonged wait time and increasing system stability.

Even though this invention is disclosed through the embodiments as above, the embodiments are not used to limit this invention, and any person with ordinary skill in the art, without deviating from the teachings and scope of this invention, may make adjustments and refinements; therefore, the scope of protection of this patent is defined as following claims.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A buffer memory management method for a buffer memory of a memory storage device having a rewritable non-volatile memory module, the buffer memory management method comprising:

allocating a first zone and a second zone in the buffer memory, wherein the first zone and the second zone respectively has a plurality of continuous buffer units, and at least a portion of the buffer units in the first zone and the second zone are stored with a plurality of logical address-physical address tables;

performing a restore operation on the buffer units in the first zone to restore the logical address-physical address mapping tables stored in the first zone to the rewritable non-volatile memory module;

receiving a first write command from a host system, wherein the first write command instructs writing first data into a first logical address and a first logical address-physical address mapping table to which the first logical address belongs is temporarily stored in a first buffer unit among the buffer units in the first zone;

writing the first data into the rewritable non-volatile memory module, copying the first logical address-physical address mapping table of the first zone to a second buffer unit among the buffer units in the second zone; and updating the first logical address-physical address mapping table temporarily stored in the second buffer unit in the second zone.

2. The buffer memory management method of claim 1, wherein the step of updating the first logical address-physical address mapping table temporarily stored in the second buffer unit in the second zone further comprises:

marking the second buffer unit as a dirty status and setting the second zone as an update area, wherein the update area is configured to temporarily store a plurality of updated logical address-physical address mapping tables.

3. The buffer memory management method of claim 2, further comprising:
restoring the logical address-physical address mapping tables in all the buffer units in the second zone to the rewritable non-volatile memory module if all the buffer units in the second zone are marked as the dirty status.

4. The buffer memory management method of claim 2, further comprising:
selecting a first one of the buffer units in the second zone as the second buffer unit and setting a first pointer to point the second buffer unit according to a precedence of the buffer units in the second zone; and
setting the first pointer to point another buffer unit among the buffer units in the second zone after the first logical address-physical address mapping table is copied to the second buffer unit in the second zone,
wherein the another buffer unit is the buffer unit next to the second buffer unit and not marked as the dirty status.

5. The buffer memory management method of claim 2, further comprising:
receiving a second write command from the host system,
wherein the second write command instructs writing second data into a second logical address, and a second logical address-physical address mapping table to which the second logical address belongs is temporarily stored into a third buffer unit among the buffer units in the second zone; and
writing the second data into the rewritable non-volatile memory module and updating the second logical address-physical address mapping table temporarily stored in the third buffer unit in the second zone.

6. The buffer memory management method of claim 2, further comprising:
receiving a third write command from the host system,
wherein the third write command instructs writing third data into a third logical address, and a third logical address-physical address mapping table to which the third logical address belongs is not yet loaded into a mapping table zone;
loading the third logical address-physical address mapping table from the rewritable non-volatile memory module, and the third logical address-physical address mapping table is temporarily stored into a fourth buffer unit among the buffer units in the second zone; and
writing the third data into the rewritable non-volatile memory module and updating the third logical address-physical address mapping table temporarily stored in the fourth buffer unit in the second zone.

7. A memory control circuit unit for controlling a rewritable non-volatile memory module, the memory control circuit unit comprising:
a host interface configured to couple to a host system;
a memory interface configured to couple to the rewritable non-volatile memory module;
a buffer memory coupled to the host interface and the memory interface; and
a memory management circuit coupled to the host interface, the memory interface, and the buffer memory, and configured to allocate a first zone and a second zone in the buffer memory, wherein each of the first zone and the second zone has a plurality of continuous buffer units and at least a portion of the buffer units in the first zone and the second zone are stored with a plurality of logical address-physical address tables,
wherein the memory management circuit is configured to perform a restore operation on the buffer units in the first zone to restore the logical address-physical address mapping tables stored in the first zone to the rewritable non-volatile memory module,
wherein the memory management circuit is further configured to receive a first write command from the host system, the first write command instructs writing first data into a first logical address, and a first logical address-physical address mapping table to which the first logical address belongs is temporarily stored in a first buffer unit among the buffer units in the first zone,
wherein the memory management circuit is further configured to write the first data into the rewritable non-volatile memory module and copy the first logical address-physical address mapping table of the first zone to a second buffer unit among the buffer units in the second zone,
wherein the memory management circuit is further configured to update the first logical address-physical address mapping table temporarily stored in the second buffer unit in the second zone.

8. The memory control circuit unit of claim 7, wherein the memory management circuit is further configured to mark the second buffer unit as a dirty status and set the second zone as an update area, wherein the update area is configured to temporarily store a plurality of updated logical address-physical address mapping tables.

9. The memory control circuit unit of claim 8, wherein the memory management circuit is further configured to restore the logical address-physical address mapping tables in all the buffer units in the second zone to the rewritable non-volatile memory module if all the buffer units in the second zone are marked as the dirty status.

10. The memory control circuit unit of claim 8, wherein the memory management circuit is further configured to select a first one of the buffer units in the second zone as the second buffer unit and set a first pointer to point the second buffer unit according to a precedence of the buffer units in the second zone,
wherein the memory management circuit is further configured to set the first pointer to point another buffer unit among the buffer units in the second zone after copying the first logical address-physical address mapping table of the first zone to the second buffer unit in the second zone, wherein the another buffer unit is the buffer unit next to the second buffer unit and not marked as the dirty status.

11. The memory control circuit unit of claim 8, wherein the memory management circuit is further configured to receive a second write command from the host system, the second write command instructs writing second data into a second logical address, and a second logical address-physical address mapping table to which the second logical address belongs is temporarily stored into a third buffer unit among the buffer units in the second zone,
wherein the memory management circuit is configured to write the second data into the rewritable non-volatile memory module and update the second logical address-physical address mapping table temporarily stored in the third buffer unit in the second zone.

12. The memory control circuit unit of claim 8, wherein the memory management circuit is further configured to receive a third write command from the host system, the third write command instructs writing third data into a third logical address, and a third logical address-physical address mapping table to which the third logical address belongs is not yet loaded into a mapping table zone, wherein the memory management circuit is further configured to load the third logical address-physical address mapping table from the rewritable non-volatile memory module, and the third logical address-physical address mapping table is temporarily stored into a fourth buffer unit among the buffer units in the second zone, and wherein the memory management circuit is configured to write the third data into the rewritable non-volatile memory module and update the third logical address-physical address mapping table temporarily stored in the fourth buffer unit in the second zone.

13. A memory storage device, comprising:

a connection interface unit configured to couple to a host system;

a rewritable non-volatile memory module; and a memory control circuit unit coupled to the connection interface unit and the rewritable nonvolatile memory module and comprising a buffer memory and configured to allocate a first zone and a second zone in the buffer memory, wherein each of the first zone and the second zone has a plurality of continuous buffer units and at least a portion of the buffer units in the first zone and the second zone are stored with a plurality of logical address-physical address tables, wherein the memory control circuit unit is configured to perform a restore operation on the buffer units in the first zone to restore the logical address-physical address mapping tables stored in the first zone to the rewritable non-volatile memory module, wherein the memory control circuit unit is further configured to receive a first write command from the host system, the first write command instructs writing first data into a first logical address, and a first logical address-physical address mapping table to which the first logical address belongs is temporarily stored in a first buffer unit among the buffer units in the first zone, wherein the memory control circuit unit is configured to write the first data into the rewritable non-volatile memory module, and copy the first logical address-physical address mapping table of the first zone to a second buffer unit among the buffer units in the second zone, wherein the memory control circuit unit is further configured to update the first logical address-physical address mapping table temporarily stored in the second buffer unit in the second zone.

14. The memory storage device of claim 13, wherein the memory control circuit unit is configured to mark the second buffer unit as a dirty status and set the second zone as an update area, wherein the update area is configured to temporarily store a plurality of updated logical address-physical address mapping tables.

15. The memory storage device of claim 14, wherein the memory control circuit unit is further configured to restore the logical address-physical address mapping tables in all the buffer units in the second zone to the rewritable non-volatile memory module if all the buffer units in the second zone are marked as the dirty status.

16. The memory storage device of claim 14, wherein the memory control circuit unit is further configured to select a first one of the buffer units in the second zone as the second buffer unit and set a first pointer to point the second buffer unit according to a precedence of the buffer units in the second zone, wherein the memory control circuit unit is further configured to set the first pointer to point another buffer unit among the buffer units in the second zone after copying the first logical address-physical address mapping table of the first zone to the second buffer unit in the second zone, wherein the another buffer unit is the buffer unit next to the second buffer unit and not marked as the dirty status.

17. The memory storage device of claim 14, wherein the memory control circuit unit is further configured to receive a second write command from the host system, the second write command instructs writing second data into a second logical address, and a second logical address-physical address mapping table to which the second logical address belongs is temporarily stored into a third buffer unit among the buffer units in the second zone, wherein the memory control circuit unit is configured to write the second data into the rewritable non-volatile memory module and update the second logical address-physical address mapping table temporarily stored in the third buffer unit in the second zone.

18. The memory storage device of claim 14, wherein the memory control circuit unit is further configured to receive a third write command from the host system, the third write command instructs writing third data into a third logical address, and a third logical address-physical address mapping table to which the third logical address belongs is not yet loaded into a mapping table zone, wherein the memory control circuit unit is further configured to load the third logical address-physical address mapping table from the rewritable non-volatile memory module, and the third logical address-physical address mapping table is temporarily stored into a fourth buffer unit among the buffer units in the second zone, and wherein the memory control circuit unit is further configured to write the third data into the rewritable non-volatile memory module and update the third logical address-physical address mapping table temporarily stored in the fourth buffer unit in the second zone.

* * * * *